US010932107B2

(12) United States Patent
Bae et al.

(10) Patent No.: US 10,932,107 B2
(45) Date of Patent: Feb. 23, 2021

(54) ELECTRONIC DEVICE AND METHOD FOR CONTROLLING NODE IN NETWORK

(71) Applicant: Samsung Electronics Co., Ltd., Gyeonggi-do (KR)

(72) Inventors: Yun-Sik Bae, Gyeonggi-do (KR);
Nam-Yong Kang, Gyeonggi-do (KR);
Dae-Hui Kang, Gyeonggi-do (KR);
Seong-Bok Kim, Gwangju (KR);
Chi-Hwan Kim, Gyeonggi-do (KR);
Doo-Suk Kang, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 57 days.

(21) Appl. No.: 16/203,774

(22) Filed: Nov. 29, 2018

(65) Prior Publication Data
US 2019/0200193 A1 Jun. 27, 2019

(30) Foreign Application Priority Data

Dec. 21, 2017 (KR) ........................ 10-2017-0177396

(51) Int. Cl.
H04W 4/50 (2018.01)
H04W 4/80 (2018.01)
(Continued)

(52) U.S. Cl.
CPC ........... H04W 4/50 (2018.02); H04L 41/0806 (2013.01); H04W 4/80 (2018.02); H04W 8/005 (2013.01);
(Continued)

(58) Field of Classification Search
None
See application file for complete search history.

(56) References Cited

U.S. PATENT DOCUMENTS

2014/0018002 A1  1/2014 Jose et al.
2015/0372875 A1* 12/2015 Turon ................ H04W 4/80
                                                                 370/254

(Continued)

FOREIGN PATENT DOCUMENTS

KR  10-2016-0115814 A  10/2016
WO     2017/222449 A1  12/2017

OTHER PUBLICATIONS

"Bluetooth Specification"; Mesh Profile; pp. 1-4, 227, and 235-239; Jul. 13, 2017; Mesh Working Group; XP055503252.
European Search Report dated Apr. 2, 2019.

Primary Examiner — Duc T Duong
(74) Attorney, Agent, or Firm — Cha & Reiter, LLC

(57) ABSTRACT

An electronic device forming a mesh network with a plurality of other devices and a method for operating the same are disclosed. According to an embodiment, an electronic device may comprise a wireless communication circuit configured to provide Bluetooth low energy (BLE) wireless communication and a control circuit operably connected with the wireless communication circuit, the control circuit configured to form a mesh network with a plurality of devices using the wireless communication circuit, where a provisioning process is performed so that each of the plurality of devices is a node in the mesh network, receive, from a first device among the plurality of devices, first information including first identification information associated with the first device and second identification information associated with a second external device outside the mesh network, determine whether the first device is able to perform the provisioning process, when the first device is determined to be able to perform the provisioning process, provide, to the first device, an authorization that allows performance of the provisioning process on the second device by the first device, and receive, from the first device, (Continued)

second information including a result of the provisioning process on the second external device and device information associated with the second external device. Other various embodiments are also possible.

19 Claims, 34 Drawing Sheets

(51) Int. Cl.
*H04W 84/18* (2009.01)
*H04L 12/24* (2006.01)
*H04W 8/00* (2009.01)
*H04W 84/10* (2009.01)
*H04W 88/04* (2009.01)

(52) U.S. Cl.
CPC ............ *H04W 84/18* (2013.01); *H04W 84/10* (2013.01); *H04W 88/04* (2013.01)

(56) References Cited

U.S. PATENT DOCUMENTS

| | | | |
|---|---|---|---|
| 2017/0156102 A1 | 6/2017 | Singh et al. | |
| 2017/0171071 A1* | 6/2017 | Turon | H04L 61/2038 |
| 2017/0230784 A1* | 8/2017 | Kwon | H04W 52/0229 |
| 2017/0295455 A1* | 10/2017 | Kwon | H04B 7/155 |
| 2017/0339653 A1* | 11/2017 | Hui | H04L 41/0859 |
| 2018/0124550 A1* | 5/2018 | Kwon | H04W 4/00 |
| 2018/0132102 A1* | 5/2018 | Kwon | H04W 40/24 |
| 2019/0089806 A1* | 3/2019 | Deshpande | H04W 76/15 |
| 2020/0068656 A1* | 2/2020 | Yang | H04W 84/18 |

\* cited by examiner

ELECTRONIC DEVICE AND METHOD FOR CONTROLLING NODE IN NETWORK

CROSS-REFERENCE TO RELATED APPLICATION(S)

This application is based on and claims priority under 35 U.S.C. § 119 to Korean Patent Application No. 10-2017-0177396, filed on Dec. 21, 2017, in the Korean Intellectual Property Office, the disclosure of which is incorporated by reference herein in its entirety.

BACKGROUND

Field

Various embodiments of the disclosure generally relate to electronic devices and methods for controlling nodes in a network.

Description of Related Art

In the art, there are various networks consisting of multiple nodes positioned at predetermined distances. Such nodes may communicate with each other via, e.g., a short-range communication protocol. When such nodes communicate with each other via short-range communication protocol over the network, relay nodes may be used. The relay nodes may relay communications between the nodes, thereby allowing the inter-node communication distance to increase.

A Bluetooth low energy (BLE) mesh network is a network made up of electronic devices that are closely positioned so that they may communicate based on BLE. To compensate for its short communication distance, the BLE mesh network may include relay nodes capable of relaying communication, thereby increasing the communication distance.

The BLE mesh network may include at least one electronic device designated as a provisioner. The provisioner may detect at least one device (e.g., an unprovisioned device) in its scan coverage. The provisioner may perform a provisioning process (e.g., a provisioning operation) to allow the at least one detected device to attend to the BLE mesh network.

The nodes (e.g. devices) constituting the BLE mesh network may support (or have) features such as relay feature, proxy feature, low power feature, and/or friend feature.

As explained above, the BLE mesh network may include a provisioner. In an exemplary BLE mesh network, the nodes in the BLE mesh network may, or may not, belong to the scan coverage of the provisioner (hereinafter, the scan coverage may be simply referred to as coverage). An external device located around the BLE mesh network (e.g., not included in the BLE mesh network) may be included in the coverage of nodes in the BLE mesh network that are not the provisioner. The external device located around the BLE mesh network, although included in the coverage of the nodes in the BLE mesh network, may not be included as a node of the BLE mesh network because it is not included in the coverage of the provisioner.

The above information is presented as background information only to assist with the understanding of the disclosure. No determination has been made, and no assertion is made, as to whether any of the above might be applicable as prior art with regard to the disclosure.

SUMMARY

According to an embodiment, there may be provided an electronic device that is an external device not included in the coverage of a provisioner of a mesh network (e.g., a BLE mesh network). The electronic device may be configured to be a node of the mesh network, when the provisioner provides a provisioning feature for a provisioning feature-supporting node.

According to an embodiment, there may be provided an electronic device that may receive a provisioning feature from a provisioner and may perform a provisioning process on an external device.

According to an embodiment, an electronic device may comprise a wireless communication circuit configured to provide Bluetooth low energy (BLE) wireless communication and a control circuit operably connected with the wireless communication circuit, the control circuit configured to form a mesh network with a plurality of devices using the wireless communication circuit, where a provisioning process is performed so that each of the plurality of devices is a node in the mesh network, receive, from a first device among the plurality of devices, first information including first identification information associated with the first device and second identification information associated with a second external device outside the mesh network, determine whether the first device is able to perform the provisioning process, when the first device is determined to be able to perform the provisioning process, provide, to the first device, authorization that allows performance of the provisioning process on the second external device by the first device, and receive, from the first device, second information including the result of the provisioning process on the second external device and device information associated with the second external device.

According to an embodiment, there is provided a computer-readable recording medium storing instructions that are executed by a processor to perform at least one operation, the at least one operation comprising forming a mesh network with a plurality of devices using a wireless communication circuit, where a provisioning process is performed so that each of the plurality of devices is a node in the mesh network, receiving, from a first device among the plurality of devices, first information including first identification information associated with the first device and second identification information associated with a second external device outside the mesh network, determining whether the first device is able to perform the provisioning process, when the first device is determined to be able to perform the provisioning process, providing, to the first device, an authorization that allows performance of the provisioning process on the second external device by the first device, and receiving, from the first device, second information including the result of the provisioning process on the second external device and device information associated with the second external device.

According to an embodiment, an electronic device may comprise a wireless communication circuit configured to provide BLE wireless communication, a memory configured to store first identification information associated with the electronic device, and a control circuit operably connected with the wireless communication circuit and the memory, the control circuit configured to using the wireless communication circuit, join the electronic device in a mesh network via a provisioning process, so that the electronic device is a node in the mesh network, where the mesh network includes a first device as a provisioner, receive, from a second external device outside the mesh network, second identification information associated with the second external device, transmit the second identification information to the first device through the wireless communication circuit, receive an authorization that allows performance of the provisioning process on the second external device from the first device through the wireless communication circuit, perform the provisioning process on the second external device through the wireless communication circuit, and transmit, to the first device, information including device information associated with the second external device and the result of the provisioning process on the second external device through the wireless communication circuit.

Other aspects, advantages, and salient features of the disclosure will become apparent to those skilled in the art from the following detailed description, which, taken in conjunction with the annexed drawings, discloses exemplary embodiments of the disclosure.

BRIEF DESCRIPTION OF THE DRAWINGS

A more complete appreciation of the disclosure and many of the attendant aspects thereof will be readily obtained as the same becomes better understood by reference to the following detailed description when considered in connection with the accompanying drawings, wherein.

Throughout the drawings, like reference numerals will be understood to refer to like parts, components, and structures.

DETAILED DESCRIPTION

Figure 1:
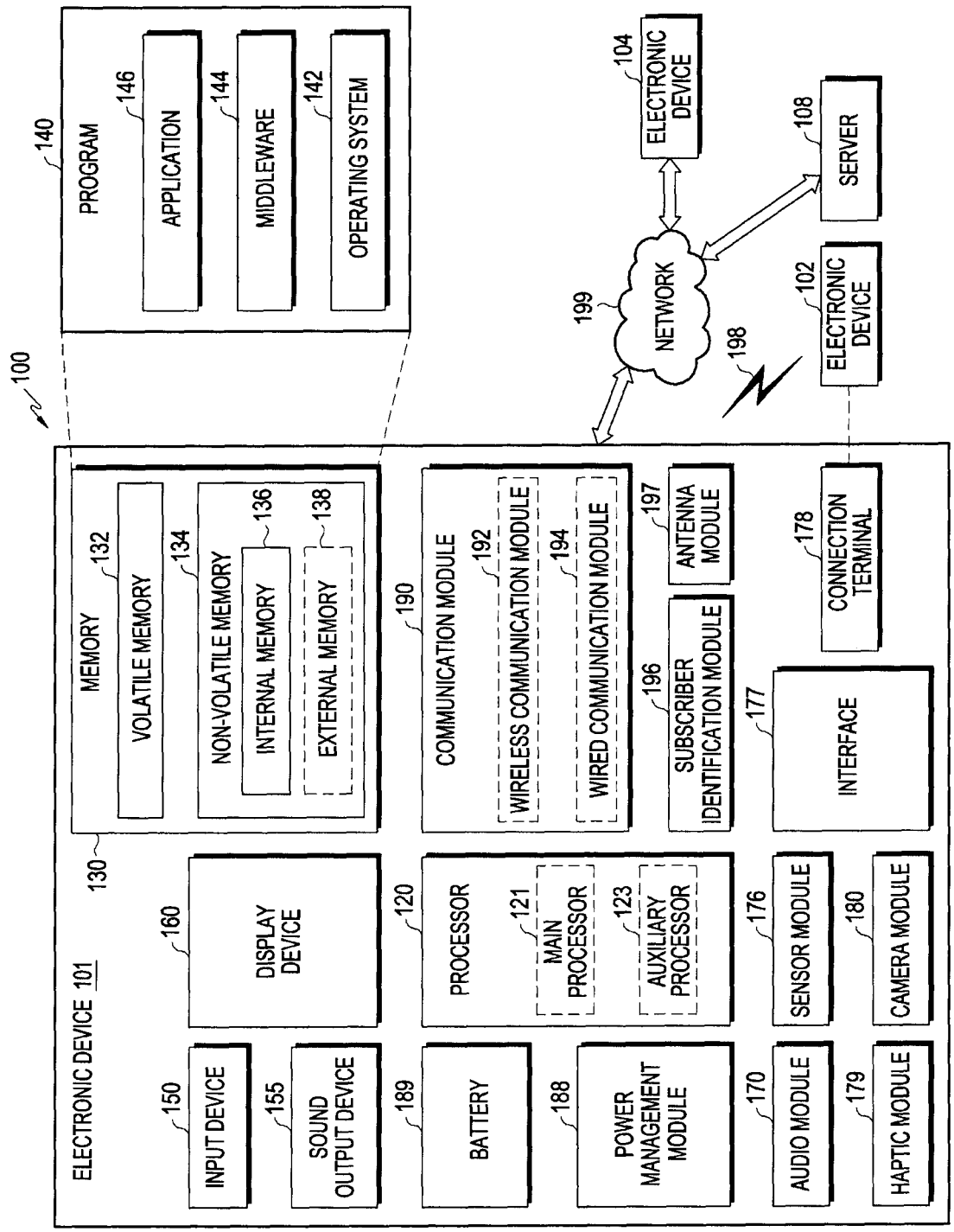
FIG. 1 is a block diagram illustrating an electronic device in a network environment according to an embodiment.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector), The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include one or more antennas, and, therefrom, at least one antenna appropriate for a communication scheme used in the communication network, such as the first network 198 or the second network 199, may be selected, for example, by the communication module 190 (e.g., the wireless communication module 192). The signal or the power may then be transmitted or received between the communication module 190 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The processor 120 may include a microprocessor or any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), a Graphical Processing Unit (GPU), a video card controller, etc. In addition, it would be recognized that when a general purpose computer accesses code for implementing the processing shown herein, the execution of the code transforms the general purpose computer into a special purpose computer for executing the processing shown herein. Certain of the functions and steps provided in the Figures may be implemented in hardware, software or a combination of both and may be performed in whole or in part within the programmed instructions of a computer. No claim element herein is to be construed under the provisions of 35 U.S.C. 112(f), unless the element is expressly recited using the phrase "means for." In addition, an artisan understands and appreciates that a "processor" or "microprocessor" may be hardware in the claimed disclosure. Under the broadest reasonable interpretation, the appended claims are statutory subject matter in compliance with 35 U.S.C. § 101.

Figure 2:
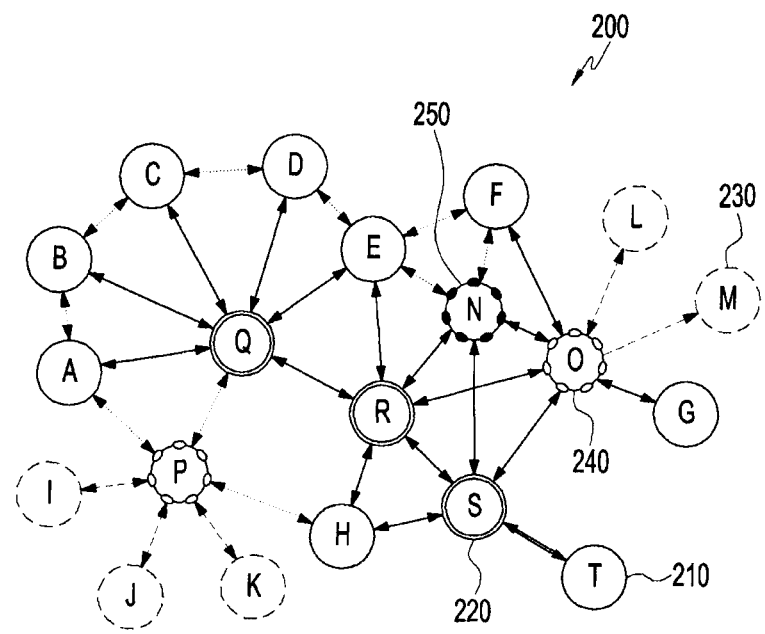
FIG. 2 is a diagram illustrating an exemplary configuration of a mesh network according to an embodiment.
Figure 2:
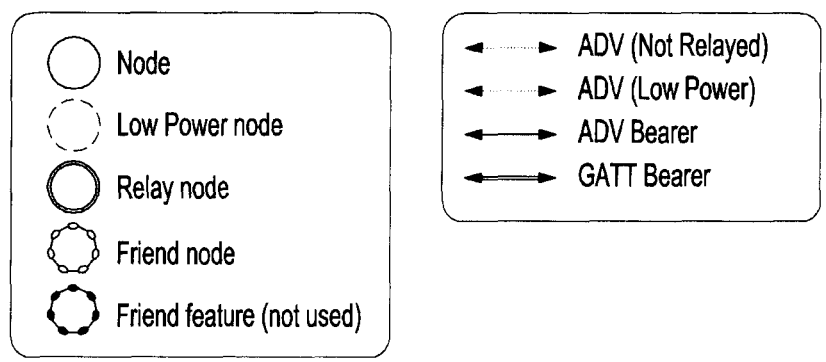

FIG. 2 is a diagram illustrating an exemplary configuration of a BLE mesh network according to an embodiment.

Referring to FIG. 2, according to an embodiment, a BLE mesh network 200 may include a plurality of nodes. According to an embodiment, the BLE mesh network 200 may include at least one relay node (e.g., node S 220) supporting a relay feature, one friend node (e.g., node O 240) supporting a friend feature, one low power node (e.g., node M 230) supporting a low power feature, and/or one proxy node (e.g., node T 210) supporting a proxy feature.

According to an embodiment, the relay feature may refer the ability to receive and retransmit messages through an advertising bearer. Network coverage may further be expanded by the relay feature. The proxy feature may refer the ability to receive and retransmit mesh messages between a generic attribute profile (GATT) and advertisement bearers. The low power feature may refer the ability for a node to operate within a mesh network at significantly reduced receive duty cycles and may be used in conjunction with a node supporting the friend feature. The friend feature may include the ability to store messages destined for nodes supporting the low power feature and to assist the low power feature-supporting nodes in operation.

According to an embodiment, various nodes included in the BLE mesh network 200 may transmit or receive mesh messages through a GATT-based bearer (GATT bearer) or advertisement (ADV)-based bearer (ADV bearer). According to an embodiment, the mesh network (e.g., the BLE mesh network 200) may include a node supporting none of the above features, e.g., node N 250. According to an embodiment, a node included in the mesh network may support at least one feature or may not support a particular feature.

According to an embodiment, the nodes forming the mesh network may support one or more of the above features. According to an embodiment, only some features may be activated as the provisioner provides features. According to an embodiment, all of the above features may be activated.

Figure 3:
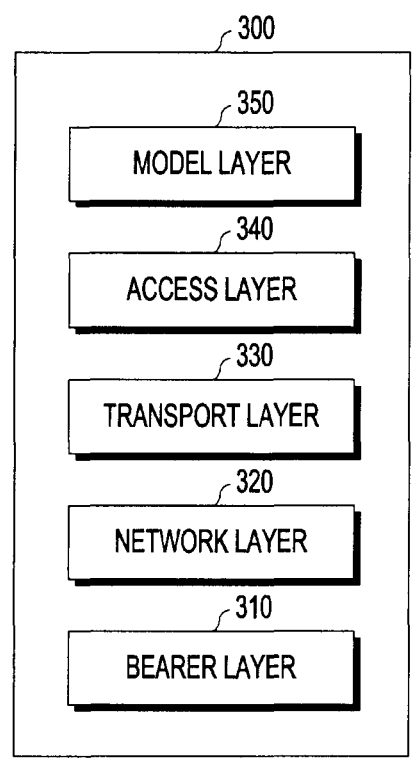
FIG. 3 is a block diagram illustrating an exemplary layer structure of a mesh network according to an embodiment.

FIG. 3 is a block diagram illustrating an exemplary layer structure of a BLE mesh network according to an embodiment.

According to an embodiment, the layer structure 300 of the BLE mesh network may include a bearer layer 310, a network layer 320, a transport layer 330, an access layer 340, and a model layer 350.

According to an embodiment, the bearer layer 310 may define a way in which network messages are transmitted between the nodes of the BLE mesh network (e.g., the BLE mesh network 200 of FIG. 2).

According to an embodiment, the network layer 320 may define a way in which transport messages towards one or more nodes are addressed. The network layer 320 may define a way in which the network messages are encrypted and authenticated. The network layer 320 may further define a network message format to allow transport packet data units (PDUs) to be transmitted by the bearer layer.

According to an embodiment, the transport layer 330 may include an upper transport layer and a lower transport layer. The upper transport layer may encrypt, decrypt, and authenticate application data. The upper transport layer may provide confidentiality for access messages. The lower transport layer may define a way in which upper transport layer messages are segmented into multiple lower transport PDUs and reassembled from multiple lower transport PDUs. The lower transport layer may define a single control message to manage the segmentation and reassembly.

According to an embodiment, the access layer 340 may define a way in which the upper transport layer may use upper layer applications. The access layer 340 may define the format of application data. The access layer 340 may define and control the encryption and decryption of application data performed on the upper transport layer.

According to an embodiment, the model layer 350 may define models used to standardize operations of typical user scenarios and models defined in Bluetooth mesh model specifications or other upper layer specifications. Other upper layer model specifications may include, for example, models for lighting or sensors.

Figure 4:
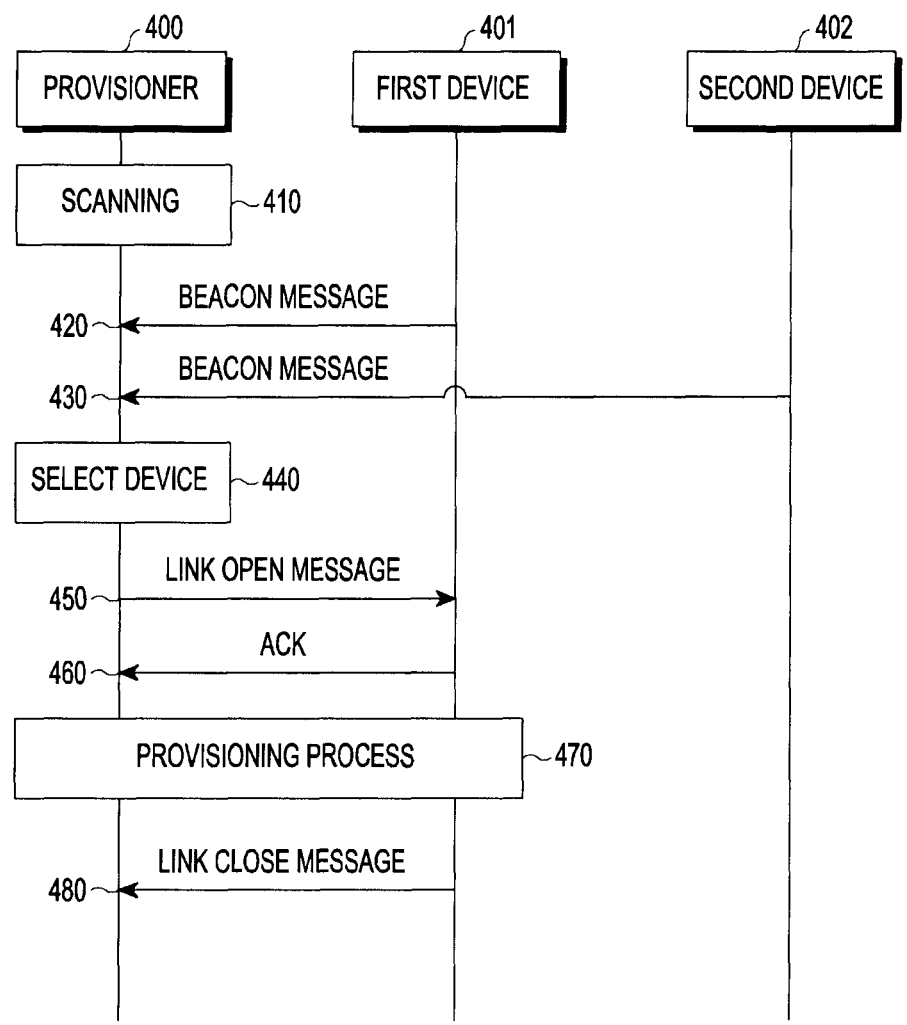
FIG. 4 is a signal flow diagram illustrating exemplary operations in which a provisioner establishes a link with an unprovisioned device to perform a provisioning process and performs the provisioning process according to an embodiment.

FIG. 4 is a signal flow diagram illustrating exemplary operations in which a provisioner (e.g., the electronic device 101 of FIG. 1) establishes a link with an unprovisioned device to perform a provisioning process and performs the provisioning process according to an embodiment.

Referring to FIG. 4, according to an embodiment, a provisioner 400 (e.g., the electronic device 101 of FIG. 1) may perform scanning to detect at least one device (e.g., a first device 401 and a second device 402) using a communication module (e.g., the communication module 190 of FIG. 1) in operation 410. According to an embodiment, low power nodes (e.g., low power feature-activated nodes) may be configured so that they cannot perform the scanning.

According to an embodiment, the provisioner 400 (e.g., the electronic device 101 of FIG. 1) may receive a beacon message transmitted from at least one device (e.g., the first device 401 and the second device 402) using the communication module (e.g., the communication module 190 of FIG. 1) in operations 420 and 430. According to an embodiment, the beacon message transmitted from the devices 401 and 402 may include, e.g., a universally unique identifier (UUID) of the devices and/or out-of-band (OOB) information supported by the devices. According to an embodiment, the provisioner 400 may identify the device that has sent (e.g., broadcast) the beacon message based on the received UUID and/or OOB information. According to an embodiment, the operation in which the devices output the beacon message or the operation in which the devices transmit the beacon message to the provisioner may also be referred to as "beaconing."

According to an embodiment, the provisioner 400 (e.g., the electronic device 101 of FIG. 1) may select a device to perform a provisioning process in operation 440. In operation 440, the provisioner 400 may select the device to perform the provisioning process based on such parameters as the received signal strength indicator (RSSI) of the devices 401 and 402. Other parameters may also be used. For example, according to an embodiment, the provisioner 400 may select the device to perform the provisioning process based on the user's selection. According to another embodiment, the provisioner 400 may select the device to perform the provisioning process based on some other designated information.

According to an embodiment, the provisioner 400 (e.g., the electronic device 101 of FIG. 1) may transmit a link open message to the device selected in operation 440 (e.g., the first device 401) through the communication module (e.g., the communication module 190 of FIG. 1) to establish a link with the first device 401 in operation 450. The link open message may contain, e.g., the UUID of the first device 401 and/or identification information about the link to be established.

According to an embodiment, in operation 460, the provisioner 400 (e.g., the electronic device 101 of FIG. 1) may receive, from the first device 401, a response to the link open message sent in operation 450 using the communication module (e.g., the communication module 190 of FIG. 1).

According to an embodiment, in operation 470, the provisioner 400 may perform a provisioning process with the first device 401 using the communication module (e.g., the communication module 190 of FIG. 1). According to an embodiment, the provisioning process may refer a process for adding an unprovisioned device (e.g., the first device 401) to the mesh network (e.g., the BLE mesh network 200 of FIG. 2) by the provisioner 400. According to an embodiment, the provisioner 400 may provide provisioning data to the unprovisioned device to permit the unprovisioned device to be a mesh node.

According to an embodiment, in operation 480, the provisioner 400 may receive a link close message from the first device 401 when the provisioning process of operation 470 is terminated using the communication module (e.g., the communication module 190 of FIG. 1).

According to an embodiment, the provisioner 400 may be a smartphone or other computing device. According to an embodiment, although a single provisioner is shown in this embodiment to perform the provisioning process over the network (e.g., the BLE mesh network of FIG. 2), multiple provisioners may also be used.

Figure 5:
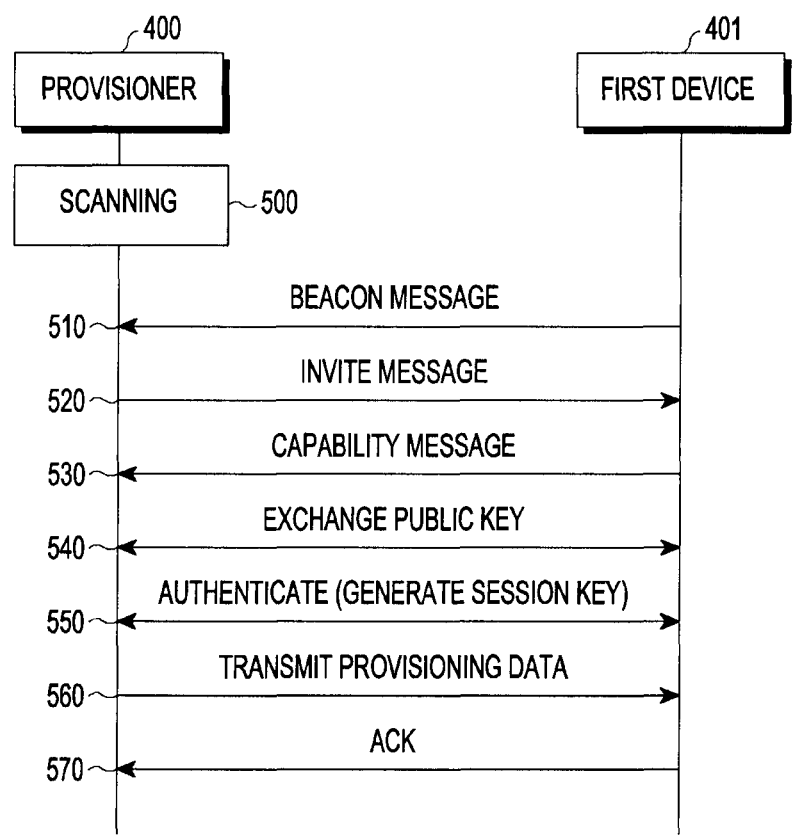
FIG. 5 is a signal flow diagram illustrating detailed exemplary operations of a provisioning process performed by a provisioner according to an embodiment.

FIG. 5 is a signal flow diagram illustrating detailed exemplary operations of a provisioning process performed by a provisioner according to an embodiment.

Referring to FIG. 5, according to an embodiment, in operation 500, the provisioner 400 (e.g., the electronic device 101 of FIG. 1) may scan the unprovisioned device (e.g., the first device 401) using the communication module (e.g., the communication module 190 of FIG. 1).

According to an embodiment, in operation 510, the provisioner 400 may receive a beacon message transmitted from the first device 401 using the communication module (e.g., the communication module 190 of FIG. 1). The beacon message may include, e.g., the UUID of the first device 401 and/or the OOB information.

According to an embodiment, in operation 520, the provisioner 400 may transmit an invite message to the first device 401 using the communication module (e.g., the communication module 190 of FIG. 1). In one embodiment, the invite message may include a PDU to inform the first device 401 that the provisioning process is about to start.

According to an embodiment, in operation 530, the provisioner 400 may receive a capability message transmitted from the first device 401 using the communication module (e.g., the communication module 190 of FIG. 1). The capability message may include, e.g., a PDU from the first device 401 to inform the provisioner 400 of the provisioning capabilities that are supported by the first device 401. The capability message may include various pieces of information, such as information about the number of elements supported by the first device 401, information about algorithms supported by the first device 401, information about public key types supported by the first device 401, information about static OOB types supported by the first device 401, or information about the maximum size of the output OOB supported by the first device 401.

According to an embodiment, in operation 540, the provisioner 400 may exchange a public key with the first device 401 using the communication module (e.g., the communication module 190 of FIG. 1). According to an embodiment, the provisioner 400 may transmit a PDU for transmitting the public key to the first device 401. The provisioner 400 may receive a response corresponding to the transmitted public key from the first device 401. According to an embodiment, the PDU for transmitting the public key may include a public key X and a public key Y each of which has a size of 32 octets.

According to an embodiment, in operation 550, the provisioner 400 may perform authentication with the first device 401. According to an embodiment, the authentication of operation 550 may include computing and generating a session key.

According to an embodiment, in operation 560, the provisioner 400 may transmit a PDU for transmitting provisioning data to the first device 401 using the communication module (e.g., the communication module 190 of FIG. 1). According to an embodiment, the PDU for transmitting the provisioning data may include an encrypted provisioning data field which has a size (or length) of 25 octets and a provisioning data message integrity check (MIC) field which has a size of 8 octets. The provisioning data is described in detail below in connection with FIG. 8B.

According to an embodiment, in operation 570, the provisioner 400 may receive a response corresponding to the transmission of the provisioning data from the first device 401 using the communication module (e.g., the communication module 190 of FIG. 1). The response transmitted in operation 570 may include a PDU for indicating that that the first device 401 has successfully received and processed the provisioning data. After operation 570, the provisioning process may be complete. According to an embodiment, when the first device 401 fails to receive or process the provisioning data, the first device 401 may transmit a PDU for indicating the failure of provisioning to the provisioner 400.

Figure 6A:
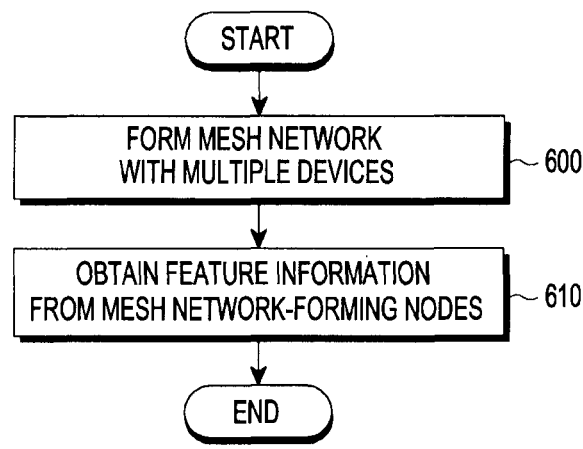
FIG. 6A is a flowchart illustrating exemplary operations in which a provisioner receives information from a node included in a mesh network about at least one feature supported by the node, according to an embodiment.

FIG. 6A is a flowchart illustrating exemplary operations in which a provisioner (e.g., the electronic device 101 of FIG. 1) receives information from a node included in a mesh network (e.g., the BLE mesh network 200 of FIG. 2) about features supported by the node, according to an embodiment. According to an embodiment, although a plurality of nodes may be included in the mesh network, the number of nodes is not limited thereto.

Referring to FIG. 6A, according to an embodiment, the provisioner (e.g., the electronic device 101 of FIG. 1), in operation 600, may form a mesh network (e.g., the BLE mesh network 200) with a plurality of devices using a communication module (e.g., the communication module 190 of FIG. 1). According to an embodiment, operation 600 may include an operation in which the provisioner performs a provisioning process (e.g., the provisioning process 470 of FIG. 4) to allow the plurality of devices to become nodes of the mesh network.

According to an embodiment, in operation 610, the provisioner may obtain feature information from the nodes in the mesh network using the communication module (e.g., the communication module 190 of FIG. 1). For ease of description, the term "information about feature" may be used interchangeably with "feature information."

Figure 6B:
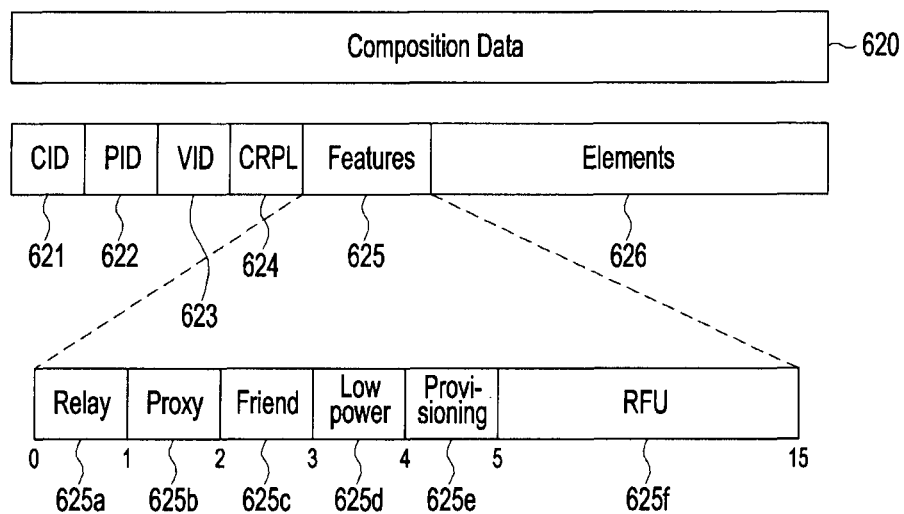
FIG. 6B is a block diagram illustrating exemplary data fields for transmitting information about features supported by a node according to an embodiment.

FIG. 6B is a block diagram illustrating exemplary data (e.g., composition data) fields for transmitting information about features supported by a node according to an embodiment.

Referring to FIG. 6B, according to an embodiment, information about features supported by nodes in a mesh network (e.g., the BLE mesh network 200) may be indicated by composition data, which may be organized into composition data pages. According to an embodiment, the information about the features supported by a particular node may be included in composition data page 0. According to an embodiment, the composition data field 620 may include a company identifier (CID) field 621 with a size of two octets, a product identifier (PID) field 622 with a size of two octets, a version identifier (VID) field 623 with a size of two octets, a computer readable program logic (CRPL) field 624 with a size of two octets or a feature field 625 with a size of two octets, and an element field 626 whose size may be variable.

According to an embodiment, the CID field 621 may contain (or store) a 16-bit company identifier. According to an embodiment, the PID field 622 may contain a 16-bit, vendor-assigned product identifier. According to an embodiment, the VID field 623 may contain a 16-bit, vendor-assigned product version identifier. According to an embodiment, the CRPL field 624 may contain a 16-bit value to indicate the minimum number of replay prevention list items of the device. According to an embodiment, the feature field 625 may include a relay field 625*a* containing one (or more)-bit information to indicate whether it supports the relay feature, a proxy field 625*b* containing one (or more)-bit information to indicate whether it supports the proxy feature, a friend field 625*c* containing one (or more)-bit information to indicate whether it supports the friend feature, a low power field 625*d* containing one (or more)-bit information to indicate whether it supports the low power feature, a provisioning field 625*e* containing one (or more)-bit information to indicate whether it supports the provisioning feature, and a reserved for future use (RFU) field 625*f*. According to other embodiments, the fields (e.g., the relay field 625*a*, the proxy field 625*b*, the friend field 625*c*, the low power field 625*d*, the provisioning field 625*e*, and the RFU field 625*f*) in the feature field 625 may be referred to by other names or terms.

According to an embodiment, when a particular device (e.g., the first device 401 of FIG. 4) supports a feature (e.g., the provisioning feature), value 1 (true) may be included in the field (e.g., the provisioning field 625*e*) corresponding to the feature that the particular device supports. According to an embodiment, if the particular device does not support a feature (e.g., the relay feature), value 0 (false) may be included in the field (e.g., the relay field 625*a*) corresponding to the feature not supported by the particular device. According to an embodiment, the composition data (or composition data page 0) may be expressed in a sequence of octets as follows.

0C001A000100080003000001050100000080010000010-03103F002A00

This exemplary composition data mentioned above may be broken down as follows.

CID is 0x000C
PID is 0x001A
VID is 0x0001
CRPL is 0x0008
Features is 0x0003—Relay and Friend features
Loc is "front"—0x0100
NumS is 5
NumV is 1
The Bluetooth SIG Models supported are,
0x0000, 0x8000, 0x0001, 0x1000, 0x1003
The Vendor Models supported are,
Company Identifier 0x003F and Model Identifier 0x002A According to an embodiment, the composition data may be transmitted from the node in the mesh network (e.g., the first device 401 after the provisioning process 470 has been performed with the provisioner 400 in FIG. 4) to the provisioner (e.g., the provisioner 400 of FIG. 4) after the provisioning process (e.g., the provisioning process 470 of FIG. 4) is complete. According to an embodiment, the composition data may be transmitted to the provisioner from all devices in the mesh network.

According to an embodiment, the information about the features supported by the nodes forming the mesh network may be transmitted to the provisioner (e.g., the provisioner 400 of FIG. 4) through a mesh message (e.g., a custom message) generated to transmit information about supported or unsupported features. According to an embodiment, the custom message may be transmitted through an advertisement bearer established between the provisioner and the node. According to an embodiment, the custom message may be transmitted to the provisioner through various bearers or various communication paths. According to an embodiment, the custom message may include information (e.g., 1 (true)) to indicate that at least one feature is supported or information (e.g., 0 (false)) to indicate that a corresponding feature is not supported.

Figure 6C:
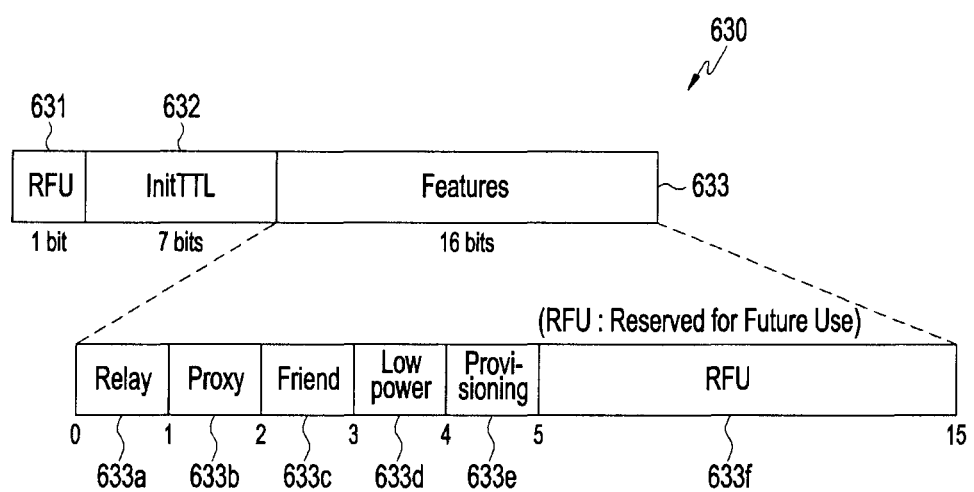
FIG. 6C is a block diagram illustrating exemplary data fields that indicate the current status of features supported by a node in a mesh network according to an embodiment.

FIG. 6C is a block diagram illustrating exemplary data fields that indicate the current status of features supported by a node in a mesh network according to an embodiment.

Referring to FIG. 6C, a node in a mesh network, (e.g., the BLE mesh network 200 of FIG. 2) may transmit information about the current status of the feature supported by it to the provisioner (e.g., the provisioner 400 of FIG. 4) through a heartbeat message 630. According to an embodiment, the provisioner may periodically/aperiodically receive the heartbeat message 630 from the node as well as from other nodes in the mesh network. According to an embodiment, the heartbeat message 630 may be used to determine that the node is still active in the mesh network. According to an embodiment, the heartbeat message 630 may be used to determine how far away the node is. According to an embodiment, the heartbeat message 630 may include an RFU field 631, an Init time to live (InitTTL) field 632, and a feature field 633.

According to an embodiment, the InitTTL field 632 may contain information about the initial TTL used when a message is transmitted. The InitTTL field 632 may have a size of, e.g., 7 bits. According to an embodiment, the InitTTL value may be, e.g., 0X00-0x7F.

According to an embodiment, the feature field 633 may include a relay field 633*a*, a proxy field 633*b*, a friend field 633*c*, a low power field 633*d*, and a provisioning field 633*e*. According to an embodiment, the feature field 633 may further include an RFU field 633*f*. According to an embodiment, the feature field 633 may contain information to indicate the current state of at least one feature supported by the node. For example, where the node (e.g., the first device 401 after the provisioning process 470 of FIG. 4 has been performed) is currently using the provisioning feature, value 1 (true) may be included and transmitted in the provisioning field 633*e*. As another example, when the node is not currently using the relay feature, value 0 (false) may be included in the relay field 633*a*. The heartbeat message 630 may then be transmitted to the provisioner.

According to an embodiment, the composition data may be transmitted from the node (e.g., the first device 401 after the provisioning process 470 of FIG. 4 has been performed) to the provisioner (e.g., the provisioner 400 of FIG. 4) using, e.g., the heartbeat message 630. However, this is merely an example. The composition data may be transmitted from the node forming the mesh network to the provisioner using various other message types, such as mesh message, advertisement message, or another type of customer message.

Figure 7:
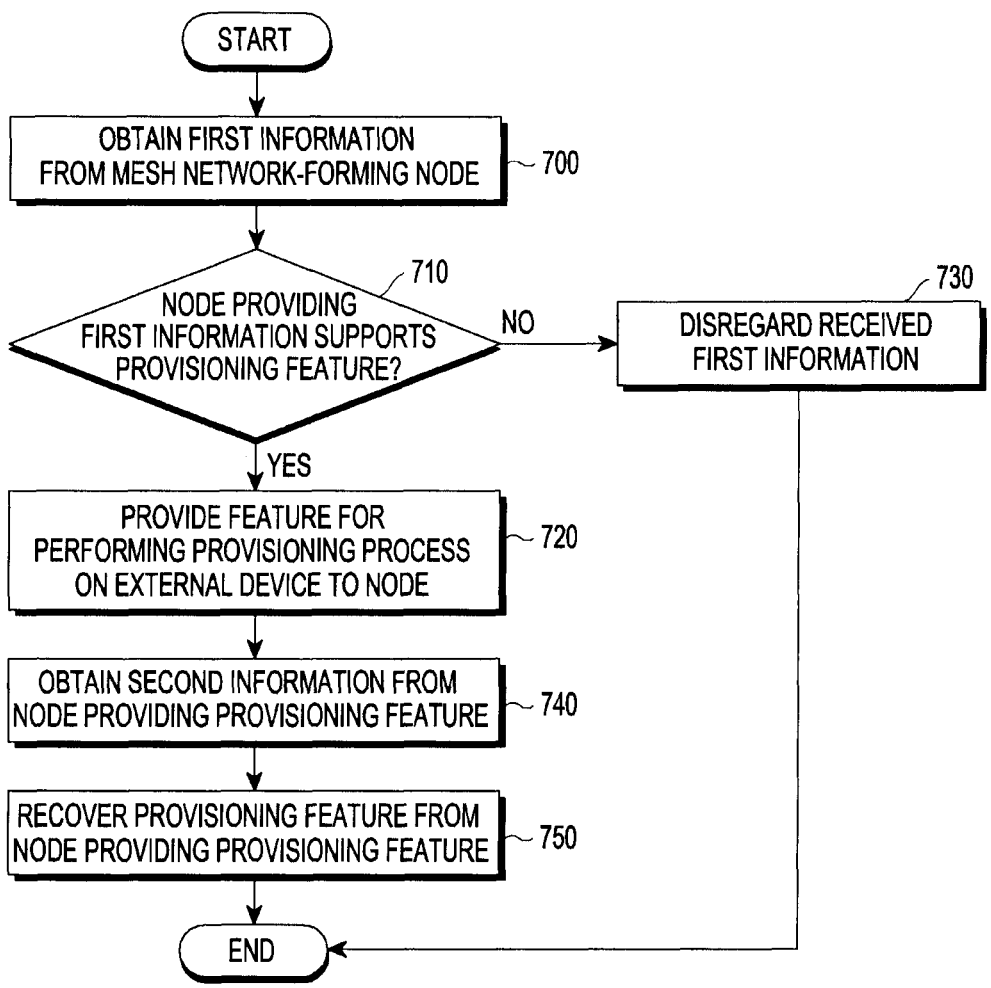
FIG. 7 is a flowchart illustrating exemplary operations of a provisioner according to an embodiment.

FIG. 7 is a flowchart illustrating exemplary operations of a provisioner (e.g., the provisioner 400 of FIG. 4) according to an embodiment.

Referring to FIG. 7, according to an embodiment, the provisioner (e.g., the processor 120 of FIG. 1) may obtain first information from a node (e.g., the first device 401 after the provisioning process 470 of FIG. 4 has been performed) that is a part of a mesh network (e.g., the BLE mesh network 200 of FIG. 2) using a communication module (e.g., the communication module 190 of FIG. 1) in operation 700. Hereinafter, the node transmitting the first information may be referred to as the "mesh network-forming node." According to an embodiment, the first information may contain information to indicate that an external device outside the mesh network, i.e. is not part of the mesh network, has been detected. According to an embodiment, the first information may contain the UUID of the detected external device and/or OOB information. According to an embodiment, the external device may be a device that is not included in the coverage of the provisioner but is included in the coverage of the node transmitting the first information. According to an embodiment, the first information may be obtained by the provisioner in a first information-containing message (which is referred to as a detection message for ease of description herein) that is transmitted from the mesh network-forming node to the provisioner. According to an embodiment, the first information may also contain information about the features supported by the mesh network-forming node and/or the detection message. According to an embodiment, the information about the features supported by the mesh network-forming node may be transmitted separately from the detection message before the detection message is transmitted. For example, the information about the features supported by the mesh network-forming node may be transmitted to the provisioner along with the detection message or separately from the detection message (e.g., at different times). According to an embodiment, the information about the features supported by the mesh network-forming node may be transmitted as composition data to the provisioner.

According to an embodiment, the provisioner (e.g., the processor 120 of FIG. 1) may determine whether the node providing the first information supports the provisioning feature in operation 710. According to an embodiment, the provisioner (e.g., the provisioner 400 of FIG. 4) may determine whether the node supports the provisioning feature based on the information about the features supported by the node that is obtained from the mesh network-forming node.

According to an embodiment, in operation 720, the provisioner (e.g., the processor 120 of FIG. 1), when the node providing the first information is determined in operation 710 to support the provisioning feature, may provide the feature for performing a provisioning process on the external device to the mesh network-forming node by using the communication module (e.g., the communication module 190 of FIG. 1). For ease of description, the first device 401 of FIG. 4 is assumed to support the provisioning feature in the description accompanying FIG. 7. According to an embodiment, providing the feature for the provisioning process for the external device may be carried out by transmitting a message to the mesh network-forming node containing information (e.g., an identifier) to indicate that the provisioning feature is provided. According to an embodiment, the message may be transmitted to the mesh network-forming node as various message types, such as a mesh message, an advertisement message, or another type of custom message. According to an embodiment, when the identifier that indicates that the provisioning feature is to be provided is 1 (true), and another identifier to indicate the recovery of the provisioning feature is 0 (false), operation 720 may include the operation of transmitting the identifier value 1 (true) to the mesh network-forming node. According to an embodiment, the mesh network-forming node may receive a feature to perform the provisioning process for the external device based on the identifier value received from the provisioner. According to an embodiment, the mesh network-forming node may activate at least one feature based on the identifier value received from the provisioner. As used herein, the term "feature" may interchangeably be used with the term "authority." According to an embodiment, the phrase "provide feature" may interchangeably be used with the phrase "give or grant authority."

According to an embodiment, upon determining that the mesh network-forming node (e.g., the first device 401 after the provisioning process 470 of FIG. 4 has been performed) does not support the provisioning feature, the provisioner (e.g., the processor 120 of FIG. 1) may disregard (e.g., discard) the received first information in operation 730.

According to an embodiment, the provisioner (e.g., the processor 120 of FIG. 1) may obtain second information from the provisioning process-providing node (e.g., the first device 401 after the provisioning process 470 of FIG. 4 has been performed) using the communication module (e.g., the communication module 190 of FIG. 1) in operation 740. According to an embodiment, the second information may contain information to indicate the result of the provisioning process on the external device and device information about the external device (e.g., the UUID of the external device and/or OOB information). According to an embodiment, the information to indicate the result of the provisioning process and the device information about the external device may be transmitted, together or separately, from the mesh network-forming node which has performed the provisioning process, e.g., the provisioning process 470 of FIG. 4.

According to an embodiment, the provisioner (e.g., the processor 120 of FIG. 1) may recover the feature from the provisioning feature-providing node (e.g., the first device 401 after the provisioning process 470 of FIG. 4 has been performed) by using the communication module (e.g., the communication module 190 of FIG. 1) in operation 750. According to an embodiment, in operation 750, the provisioner (e.g., the electronic device 101 of FIG. 1) may request the provisioning feature-providing node, which may be the same node as the mesh network-forming node, (e.g., the first device 401 after the provisioning process 470 of FIG. 4 has been performed) to discard the provisioning feature (e.g., delete or deactivate the feature) provided to the node as per operation 720. According to an embodiment, the discard request may be transmitted in the form of, e.g., a mesh message, to the provisioning feature-providing node.

Figure 8A:
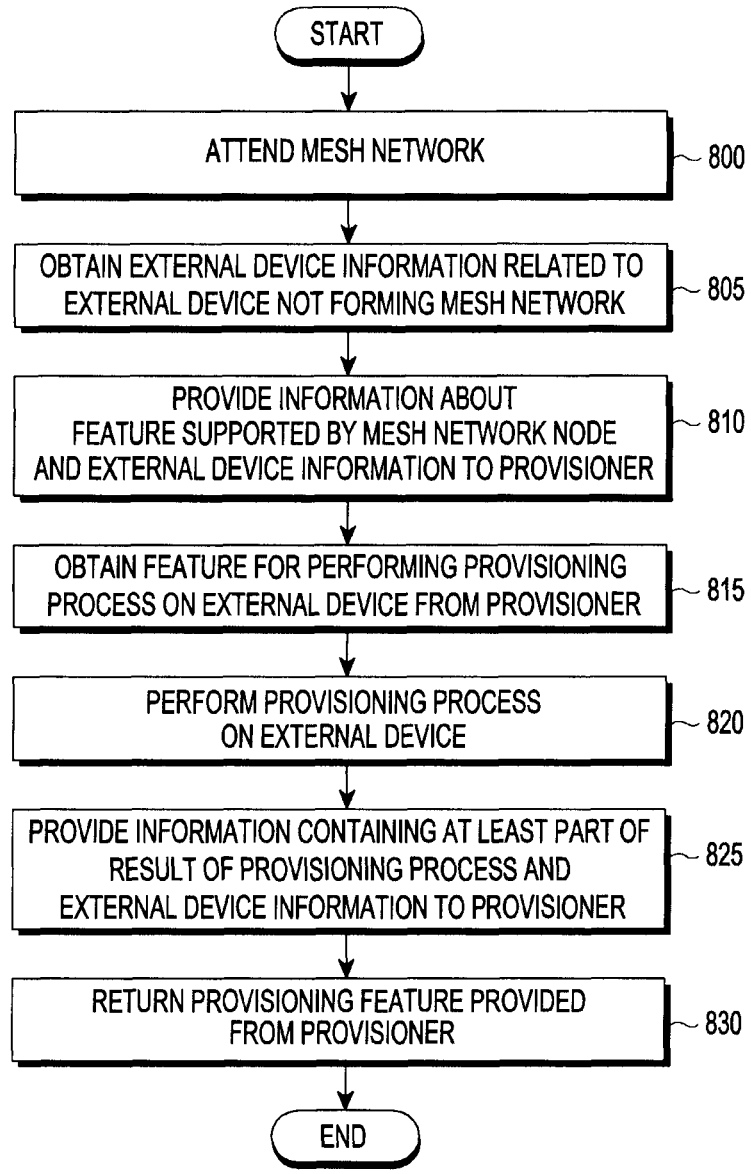
FIG. 8A is a flowchart illustrating exemplary operations of a node supporting a provisioning feature and forming a mesh network according to an embodiment.

FIG. 8A is a flowchart illustrating exemplary operations of a node forming a mesh network (e.g., the BLE mesh network 200 of FIG. 2), supporting a provisioning feature, according to an embodiment. The node may be the first device 401 after the provisioning process 470 of FIG. 4 has been performed. For ease of description, the "first device 401 after the provisioning process of FIG. 4 has been performed" may be an example of a device to support the provisioning feature in the description accompanying FIGS. 8A and 8B.

Referring to FIG. 8A, according to an embodiment, the mesh network-forming device (e.g., the first device 401 before the provisioning process 470 of FIG. 4 is performed), in operation 800, may be a node forming a mesh network (e.g., the BLE mesh network 200 of FIG. 2) through a provisioning process with the provisioner using a communication module and may be a part of the mesh network.

According to an embodiment, the mesh network-forming device (e.g., the first device 401 after the provisioning process 470 of FIG. 4 has been performed) may obtain information about an external device that is outside the mesh network using the communication module in operation 805. According to an embodiment, the device information about the external device obtained by operation 805 may contain, e.g., the UUID of the external device and/or OOB information. According to an embodiment, the mesh network-forming device (e.g., the first device 401 after the provisioning process 470 of FIG. 4 has been performed) may perform a scanning operation to obtain the device information about the external device.

According to an embodiment, the mesh network-forming device (e.g., the first device 401 after the provisioning process 470 of FIG. 4 has been performed), in operation 810, may provide information about the features that the mesh network-forming device (e.g., the first device 401 after the provisioning process 470 of FIG. 4 has been performed) supports and information about the external device to the provisioner. FIG. 8A illustrates an embodiment in which the information about the features the mesh network-forming device supports, along with the device information about the external device, is transmitted together. According to an embodiment, the information about the features the mesh network-forming device supports and the device information about the external device may be separately (e.g., at different times) transmitted to the provisioner.

According to an embodiment, the mesh network-forming device (e.g., first device 401 after the provisioning process 470 of FIG. 4 has been performed), in operation 815, may obtain the feature for performing a provisioning process on the external device from the provisioner using the communication module.

According to an embodiment, the mesh network-forming device (e.g., first device 401 after the provisioning process 470 of FIG. 4 has been performed), in operation 820, may perform the provisioning process on the external device by using the communication module.

According to an embodiment, the mesh network-forming device (e.g., first device 401 after the provisioning process 470 of FIG. 4 has been performed), in operation 825, may transmit information containing at least part of the information about the external device and the result of the provisioning process on the external device to the provisioner.

According to an embodiment, the mesh network-forming device (e.g., first device 401 after the provisioning process 470 of FIG. 4 has been performed), in operation 830, may return the feature, which has been obtained from the provisioner, to the provisioner. According to an embodiment, operation 830 may be performed by the mesh network-forming device after completing the provisioning process with the external device or after completing operation 825, and the feature may be recovered by the provisioner after receiving the result of provisioning in operation 825. For example, according to an embodiment, the mesh network-forming device (e.g., first device 401 after the provisioning process 470 of FIG. 4 has been performed) may return the provisioning feature by discarding (e.g., operation 750 of FIG. 7) the provisioning feature as per a discarding request from the provisioner. Alternatively, after completing operation 820 or 825, the mesh network-forming device (e.g., first device 401 after the provisioning process 470 of FIG. 4 has been performed) may display a selection message to receive the user's selection as to whether to discard the feature provided from the provisioner and may discard the provisioning feature if the user so selects. According to an embodiment, operation 830 may include varying (e.g., from 1 (true) to 0 (false)) the value of the identifier related to providing the provisioning feature or deleting the identifier value (e.g., 1 (true)) received from the provisioner in relation to providing the provisioning feature.

Figure 8B:
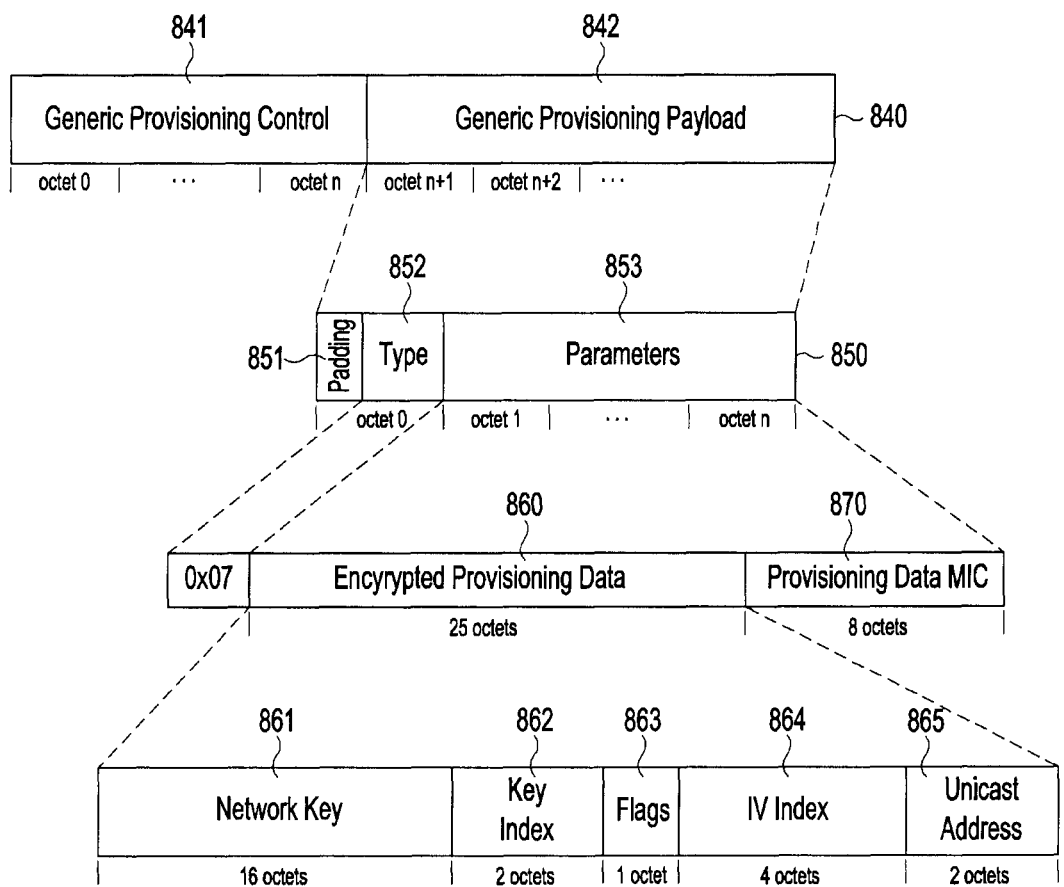
FIG. 8B is a block diagram illustrating exemplary provisioning data transmitted to an external device in a provisioning process according to an embodiment.

FIG. 8B is a block diagram illustrating exemplary provisioning data transmitted to an external device in a provisioning process according to an embodiment.

Referring to FIG. 8B, according to an embodiment, a generic provisioning PDU 840 may include a generic provisioning control (GPC) field 841 and a generic provisioning payload field 842. According to an embodiment, the GPC field 841 may have a variable size ranging from, e.g., 1 octet to, e.g., 17 octets.

According to an embodiment, the generic provisioning payload field 842 may have a variable size ranging from 0 octets to 64 octets. According to an embodiment, the generic provisioning payload field 842 may include a padding field 851, a type field 852, and a parameter field 853. According to an embodiment, the padding field 851 may have a size of two-bits. For example, the padding field 851 may have a value of 0b00. According to an embodiment, the type field 852 may have a size of six-bits. The type field 852 may include, e.g., a value for the provisioning PDU type. The value for the provisioning PDU type may be defined as shown in Table 1 below.

TABLE 1

| Type | Name |
| --- | --- |
| 0x00 | provisioning invitation |
| 0x01 | provisioning capabilities |
| 0x02 | provisioning start |
| 0x03 | provisioning public key |
| 0x04 | provisioning input complete |
| 0x05 | provisioning confirmation |
| 0x06 | provisioning random |
| 0x07 | provisioning data |
| 0x08 | provisioning complete |
| 0x09 | provisioning failed |
| 0x0A-0xFF | RFU |

According to an embodiment, the parameter field 853 may have a variable size. The parameter field 853 may include various message parameters. According to an embodiment, the parameter field 853 may include an encrypted provisioning data field 860 and a provisioning data MIC field 870. According to an embodiment, the encrypted provisioning data field 860 may include a network key field 861 with a size of 16 octets, a key index field 862 with a size of 2 octets, a flag field 863 with a size of 1 octet, an initialization vector (IV) index field 864 with a size of 4 octets, and a unicast address field 865 with a size of 2 octets.

According to an embodiment, the network key field 861 may include a network key. According to an embodiment, the key index field 862 may include the index of the network key. According to an embodiment, the flag field 863 may include a key refresh flag field (not shown) with a one-bit size that contains a key refresh flag, an IV index flag field (not shown) with a one-bit size that contains an IV index flag, and an RFU field (not shown) with a five-bit size. According to an embodiment, the IV index field 864 may include the current IV index value. According to an embodiment, the unicast address field 965 may include the unicast address of the primary element of the node added to the mesh network (e.g., the BLE mesh network 200 of FIG. 2).

According to an embodiment, the node (e.g., first device 401 after the provisioning process 470 of FIG. 4 has been performed) forming the mesh network (e.g., the BLE mesh network 200 of FIG. 2) may provide the network key of the mesh network to the external device through the provisioning process operation with the external device. Thus, the external device may have the same network key as that of the node forming the mesh network and may thus be included in the mesh network. According to an embodiment, the provisioner (e.g., the provisioner 400 of FIG. 4) and/or the node (e.g., first device 401 after the provisioning process 470 of FIG. 4 has been performed) forming the mesh network may generate at least one of a network identifier (NID), an encrypted key, and a privacy key using the network key. When the mesh network-forming node receives a mesh message from another node (e.g., the external device after the provisioning process has been performed), the mesh network-forming node may then perform an authentication process based on the network key (e.g., using the NID). For example, the mesh network-forming node (e.g., first device 401 after the provisioning process 470 of FIG. 4 has been performed) may compare the NID the node is aware of with the NID value contained in the NID field of the mesh message, and when the NIDs do not match, the node may disregard the received mesh message. Conversely, when the NIDs match, the mesh network-forming node may authenticate the message.

According to an embodiment, the mesh network itself may form one subnet. According to an embodiment, the subnet may mean a group of nodes that may communicate with each other as they share the network key on the network layer. According to an embodiment, the mesh network may include one or more subnets.

Figure 9A:
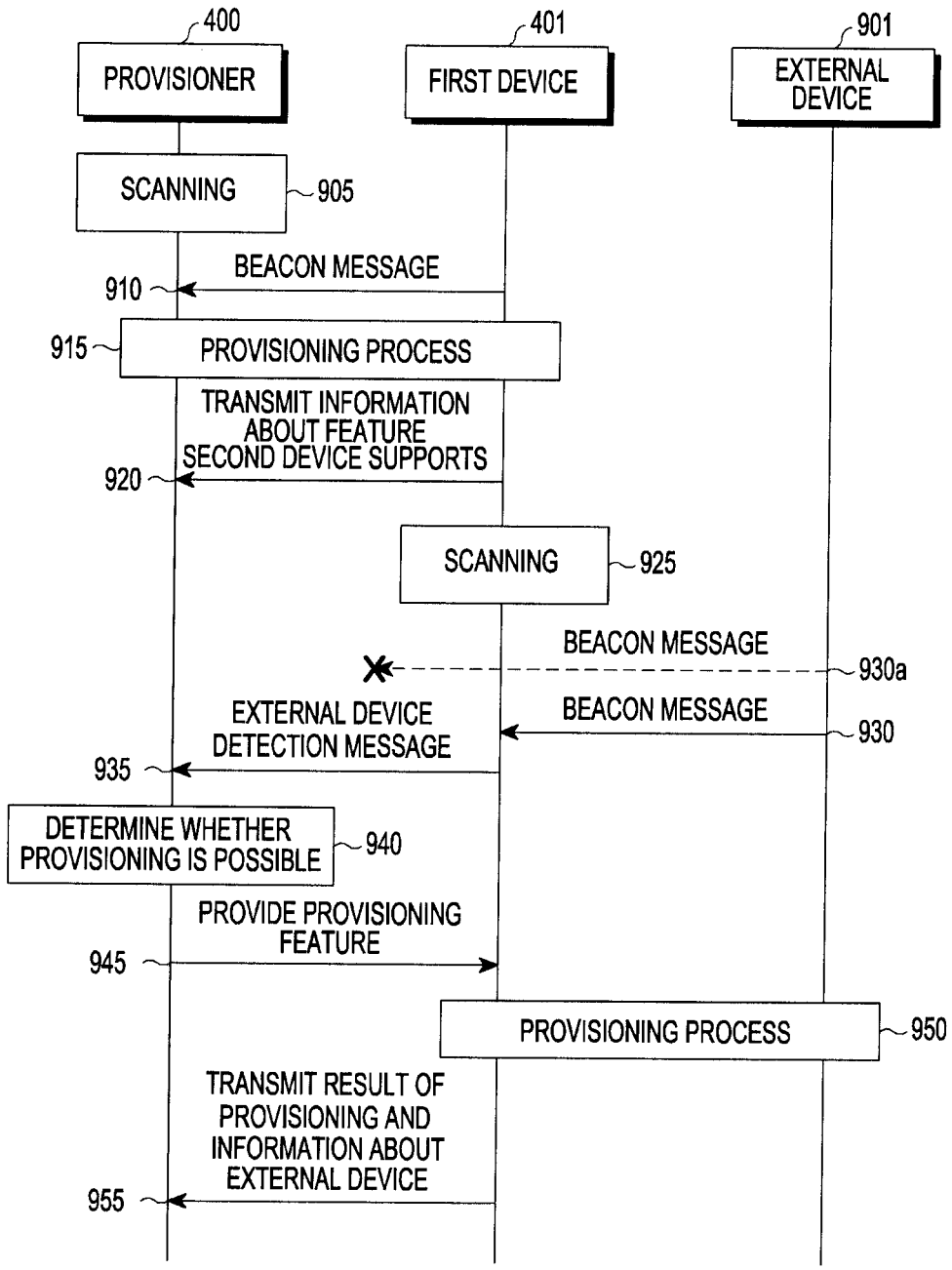
FIG. 9A is a signal flow diagram illustrating an exemplary operation for forming an external device with nodes of a mesh network in the mesh network according to an embodiment.

FIG. 9A is a signal flow diagram illustrating an exemplary operation for forming an external device with nodes of a mesh network in the mesh network (e.g., the BLE mesh network 200 of FIG. 2) according to an embodiment.

Referring to FIG. 9A, according to an embodiment, the provisioner (e.g., the processor 120 of FIG. 1), in operation 905, may perform scanning to detect a device (e.g., the first device 401) included in the coverage of the provisioner by using a communication module (e.g., the communication module 190 of FIG. 1).

According to an embodiment, in operation 910, the provisioner 400 (e.g., the processor 120 of FIG. 1) may receive a beacon message transmitted from the first device 401 by using the communication module (e.g., the communication module 190 of FIG. 1).

According to an embodiment, the provisioner 400 (e.g., the processor 120 of FIG. 1), in operation 915, may perform a provisioning process with the first device 401 based on the beacon message received as per operation 910, by using the communication module (e.g., the communication module 190 of FIG. 1).

According to an embodiment, the provisioner 400 (e.g., the processor 120 of FIG. 1), in operation 920, may obtain information about features the first device 401 supports from the first device 401 (e.g., the mesh network-forming node) after completing the provisioning process of operation 915, by using the communication module (e.g., the communication module 190 of FIG. 1). According to an embodiment, even after performing the provisioning process of operation 915, the first device 401 may provide the information about the features the first device 401 supports to the provisioner in the form of, e.g., a custom message.

According to an embodiment, the first device 401, in operation 925, may perform scanning to detect the external device 901 that is not part of the mesh network by using the communication module.

According to an embodiment, the first device 401, in operation 930, may receive the beacon message transmitted from the external device 901 by using the communication module, thereby detecting the external device 901. According to an embodiment, since the external device 901 falls outside the coverage of the provisioner 400, the provisioner 400 may not receive the beacon message transmitted from the external device 901 (930a).

According to an embodiment, the first device 401, in operation 935, may transmit a detection message to the provisioner 400 by using its communication module to indicate the detection of the external device 901.

According to an embodiment, the provisioner 400 (e.g., the processor 120 of FIG. 1), in operation 940, may determine whether the first device 401 is a device capable of provisioning, e.g., a device supporting the provisioning feature, based on the information obtained as per operation 920.

According to an embodiment, the provisioner 400 (e.g., the processor 120 of FIG. 1), in operation 945, may provide the provisioning feature to the first device 401 by using the communication module (e.g., the communication module 190 of FIG. 1) when the first device 401 supports the provisioning feature. According to an embodiment, if the first device 401 does not support the provisioning feature, the provisioner 400 may request another provisioning feature-supporting node among the mesh network-forming nodes to perform the provisioning process on the external device 901.

According to an embodiment, the first device 401, in operation 950, may perform the provisioning process with the external device 901 by using its communication module. According to an embodiment, the network key of the mesh network (e.g., the BLE mesh network 200 of FIG. 2) and various pieces of information related to the network key (e.g., NID or privacy key) may be provided to the external device 901 through the provisioning process.

According to an embodiment, the first device 401, in operation 955, may transmit device information about the external device 901 and the result of the provisioning process to the provisioner 400 by using its communication module. After operation 955, the provisioning feature of the first device 401 may be deactivated by the first device 401 or the provisioner 400. According to another embodiment, after operation 955, the provisioning feature provided from the provisioner 400 may be maintained. Once provisioned and included in the mesh network, the external device 901 may transmit messages to the provisioner 400 through the first device 401.

Figure 9B:
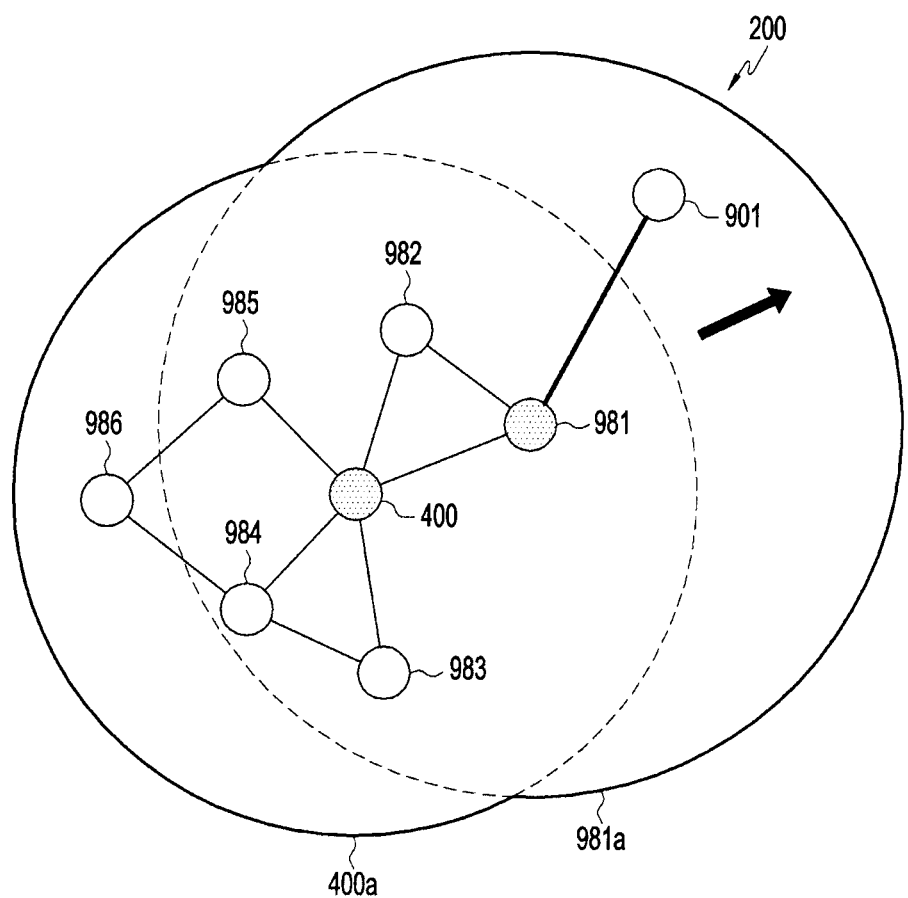
FIG. 9B is a diagram illustrating an expanded coverage of a provisioner according to an embodiment.

FIG. 9B is a diagram illustrating an expanded coverage of a provisioner (e.g., the provisioner 400 of FIG. 9A) according to an embodiment.

Referring to FIG. 9B, according to an embodiment, a mesh network (e.g., the BLE mesh network 200) may include a provisioner 400, a first node 981, a second node 982, a third node 983, a fourth node 984, a fifth node 985, and a sixth node 986.

According to an embodiment, among the first node 981 to the sixth node 986, the first node 981 may be a node supporting the provisioning feature. According to an embodiment, upon receiving the provisioning feature from the provisioner 400, the first node 981 may perform the provisioning process on the external device 901 included in the coverage 981a of the first node 981. By affecting the provisioning process between the first node 981 and the external device 901, the external device 901 may be included in the mesh network according to an embodiment. According to an embodiment, the external device 901, despite being a device not included in the coverage 400a of the provisioner 400, may become a mesh network-forming node. Thus, the coverage of the provisioner 400 may substantially be expanded by the first node 981.

Figure 9C:
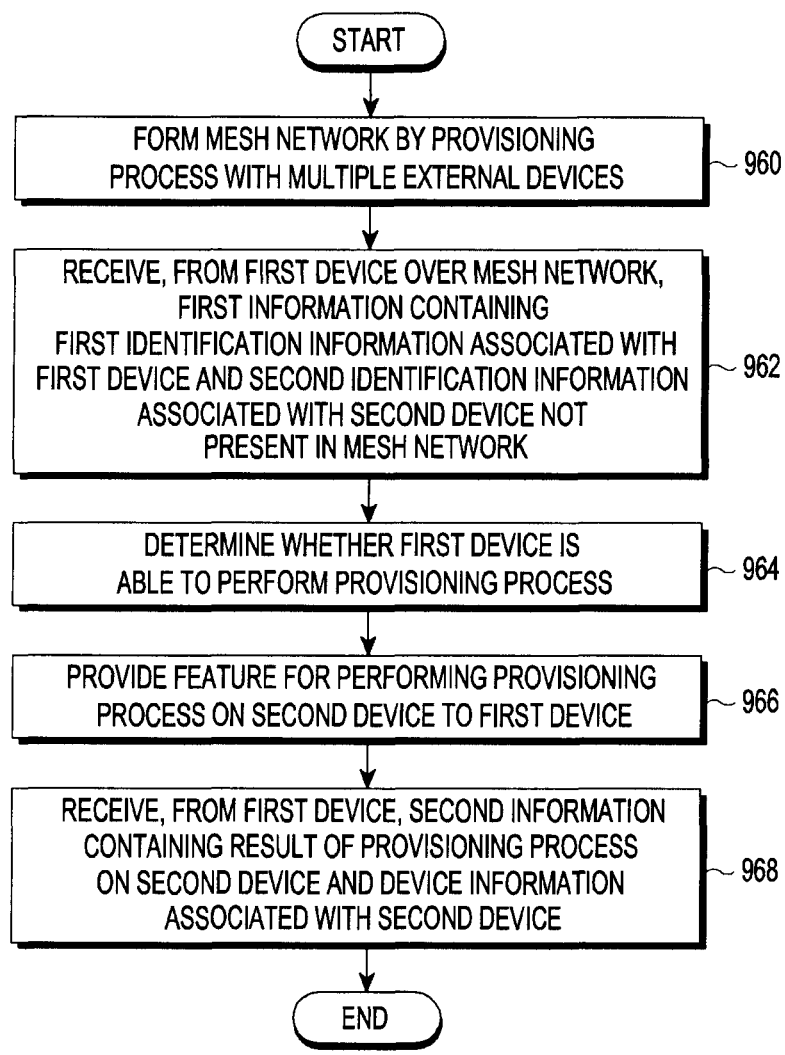
FIG. 9C and FIG. 9D are flowcharts illustrating exemplary methods for operating an electronic device according to an embodiment.
Figure 9D:
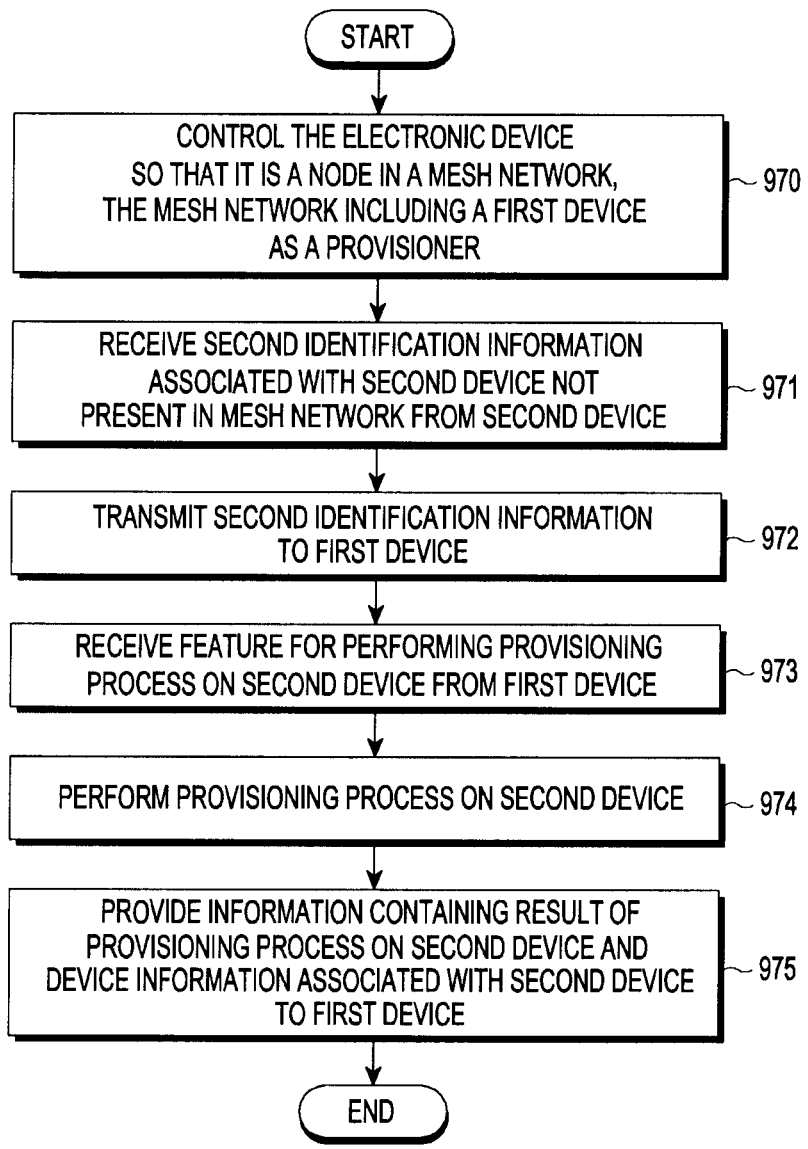

FIGS. 9C and 9D are flowcharts illustrating exemplary methods for operating an electronic device (e.g., the provisioner 400 of FIG. 4) according to an embodiment.

Referring to FIG. 9C, according to an embodiment, an electronic device (e.g., the processor 120 of FIG. 1), in operation 960, may form a mesh network via a provisioning process with at least one external device by using a communication module (e.g., the communication module 190 of FIG. 1).

According to an embodiment, the electronic device (e.g., the processor 120 of FIG. 1), in operation 962, may receive first information containing first identification information associated with a first device (e.g., the first device 401 of FIG. 9) on the mesh network and second identification information associated with a second device (e.g., the external device 901 of FIG. 9) not present in the network from the first device 401 by using the communication module (e.g., the communication module 190 of FIG. 1).

According to an embodiment, the electronic device (e.g., the processor 120 of FIG. 1), in operation 964, may determine whether the first device (e.g., the first device 401 of FIG. 9A) may perform the provisioning process.

According to an embodiment, the electronic device (e.g., the processor 120 of FIG. 1), in operation 966, may provide the feature of performing the provisioning process on the second device (e.g., the external device 901 of FIG. 9A) to the first device by using the communication module (e.g., the communication module 190 of FIG. 1)

According to an embodiment, the electronic device (e.g., the processor 120 of FIG. 1), in operation 968, may receive second information containing device information associated with the second device and the result of the provisioning process on the second device (e.g., the external device 901 of FIG. 9A) from the first device (e.g., the first device 401 of FIG. 9A) by using the communication module (e.g., the communication module 190 of FIG. 1).

According to an embodiment, in connection with FIG. 9D, the electronic device (e.g., the electronic device 101 of FIG. 1) may operate as a node (e.g., the first device 401 of FIG. 9A) forming the mesh network (e.g., the BLE mesh network 200 of FIG. 2). FIG. 9D illustrates an exemplary method in which the electronic device (e.g., the electronic device 101 of FIG. 1) operates as a node of the mesh network.

Referring to FIG. 9D, according to an embodiment, the electronic device (e.g., the processor 120 of FIG. 1), in operation 970, may control itself so that the electronic device 101 is rendered a node in the mesh network via the provisioning process by using the communication module (e.g., the communication module 190 of FIG. 1) of the electronic device. The mesh network may include a first device as the provisioner.

According to an embodiment, the electronic device (e.g., the processor 120 of FIG. 1), in operation 971, may receive second identification information associated with a second device from the second device (e.g., the external device 901 of FIG. 9A) that is not part of the mesh network by using the communication module (e.g., the communication module 190 of FIG. 1).

According to an embodiment, the electronic device (e.g., the processor 120 of FIG. 1), in operation 972, may transmit the second identification information to the first device (e.g., the provisioner 400 of FIG. 9A) by using the communication module (e.g., the communication module 190 of FIG. 1).

According to an embodiment, the electronic device (e.g., the processor 120 of FIG. 1), in operation 973, may receive the feature of performing the provisioning process on the second device (e.g., the external device 901 of FIG. 9A) from the first device (e.g., the provisioner 400 of FIG. 9A) by using the communication module (e.g., the communication module 190 of FIG. 1).

According to an embodiment, the electronic device (e.g., the processor 120 of FIG. 1), in operation 974, may perform the provisioning process on the second device by using the communication module (e.g., the communication module 190 of FIG. 1).

According to an embodiment, the electronic device (e.g., the processor 120 of FIG. 1), in operation 975, may provide information containing the device information associated with the second device and the result of the provisioning process on the second device to the first device by using the communication module (e.g., the communication module 190 of FIG. 1).

According to an embodiment, the operation of providing, by the provisioner, the provisioning feature to the mesh network-forming node may be carried out before or after the node receives the detection message for the external device.

Figure 10A:
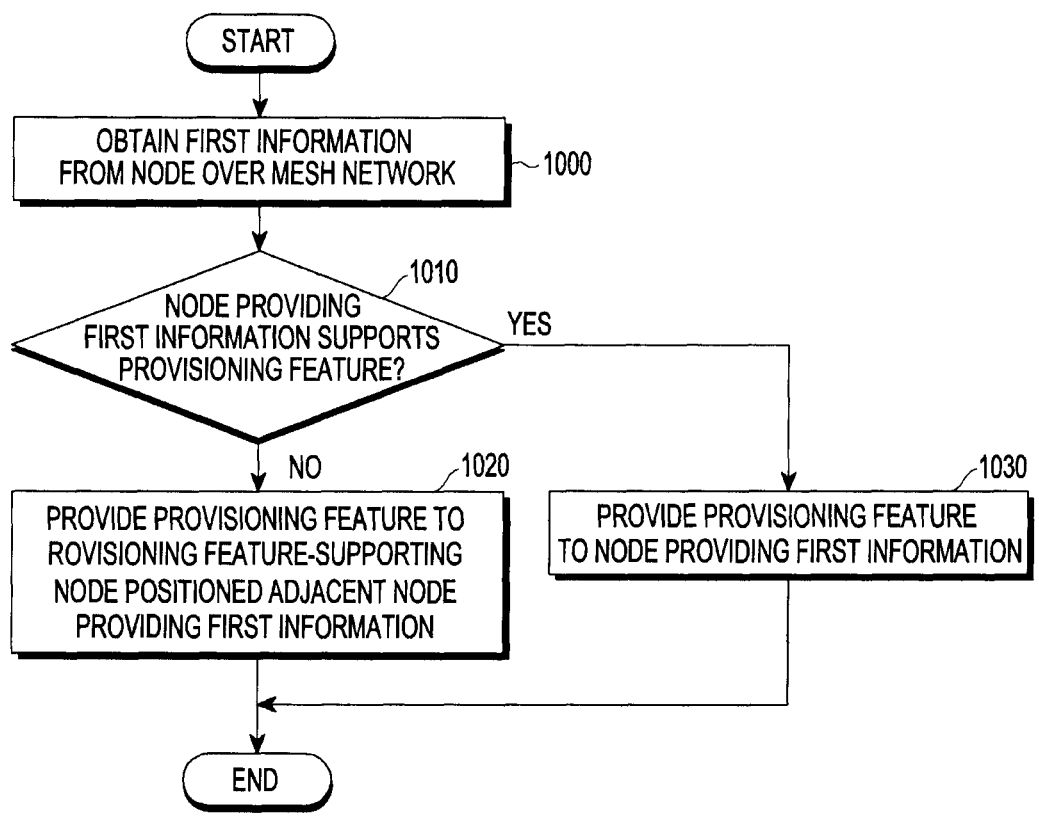
FIG. 10A is a flowchart and FIG. 10B is a diagram illustrating exemplary operations in which a provisioner, after receiving an external device detection message from a first node, provides a provisioning feature to a node positioned adjacent the first node according to an embodiment.
Figure 10B:
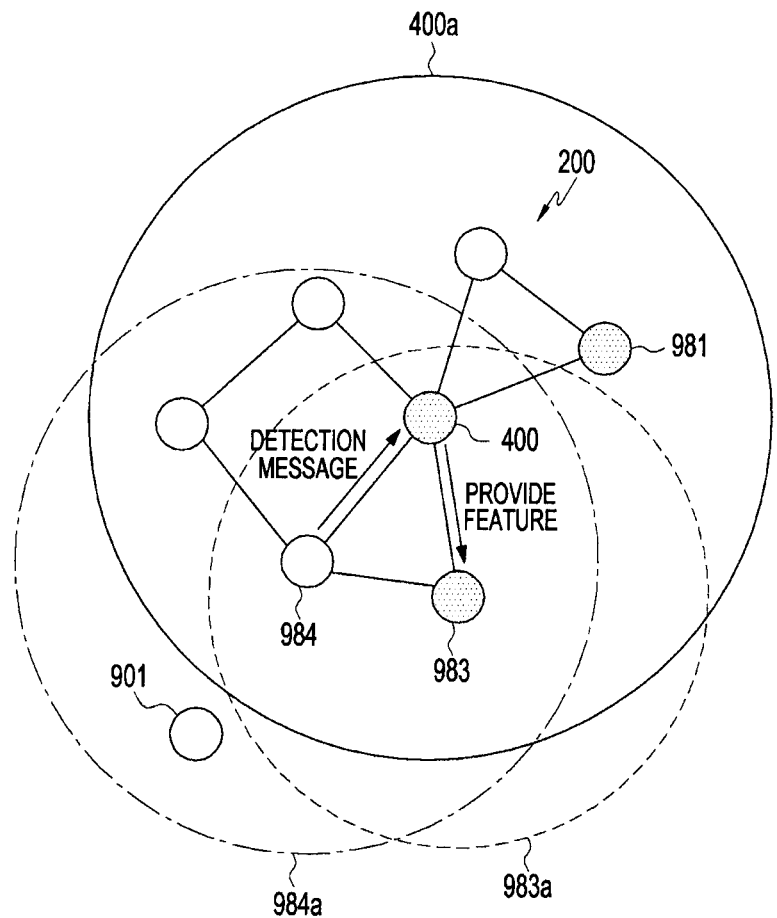

FIG. 10A is a flowchart and FIG. 10B is a diagram illustrating exemplary operations in which a provisioner (e.g., the provisioner 400 of FIG. 4), after receiving an external device detection message from a first node, provides a provisioning feature to a node positioned adjacent to the first node according to an embodiment.

Referring to FIG. 10A, according to an embodiment, the provisioner (e.g., the processor 120 of FIG. 1) may obtain first information from a node forming a mesh network (e.g., the BLE mesh network 200 of FIG. 2) by using a communication module (e.g., the communication module 190 of FIG. 1) in operation 1000. According to an embodiment, the first information may include device information (e.g., the UUID and/or OOB information) about an external device (e.g., the external device 901 of FIG. 9A) detected by the mesh network-forming node.

According to an embodiment, the first information may include information indicating that the external device has been detected.

According to an embodiment, the provisioner (e.g., the processor 120 of FIG. 1) may determine whether the node providing the first information supports the provisioning feature in operation 1010.

According to an embodiment, upon determining that the node providing the first information is a node that does not support the provisioning feature, the provisioner (e.g., the processor 120 of FIG. 1) may provide the provisioning feature to another node that provides the provisioning feature and is positioned adjacent to the node providing the first information.

According to an embodiment, the mesh network-forming node (e.g., the node not supporting the provisioning feature) may perform scanning, thereby detecting information (e.g., received signal strength indicator (RSSI)) regarding the communication sensitivity of other mesh network-forming nodes and information about neighboring nodes (e.g., the UUIDs of the neighboring nodes). The node that does not support the provisioning feature, i.e. the mesh network-forming node referred to above, may determine relative distances from the other neighboring nodes based on the detected RSSI. According to another embodiment, the relative distance between the node not supporting the provisioning feature and another node positioned around the node that does support the provisioning feature may also be determined by the provisioner (e.g., the provisioner 400 of FIG. 4).

The node that does not support the provisioning feature may transmit, e.g., information about the determined relative distance and the UUID of the neighboring node to the provisioner (e.g., the provisioner 400 of FIG. 4). According to an embodiment, the provisioner may determine whether the node (e.g., the neighboring node) positioned around the node that does not support the provisioning feature supports the provisioning feature based on the information received from the node that does not support the provisioning feature. According to an embodiment, when the neighboring node supports the provisioning feature, the provisioner may provide the provisioning feature to the neighboring node that does support the provisioning feature.

According to an embodiment, the provisioner (e.g., the provisioner 400 of FIG. 4) may provide the provisioning feature to provisioning feature-supporting nodes among nodes with a designated hop count (e.g., one hop or two hops) or less with respect to the node that does not support the provisioning feature. According to an embodiment, the node that does not support the provisioning feature may broadcast messages, and depending on whether there is a message received corresponding to the broadcast messages, the node that does not support the provisioning feature may determine whether there is at least one node around it. For example, based on such determination, the node that does not support the provisioning feature may transmit a message containing information indicating that there is at least one node around it to the provisioner.

According to an embodiment, upon determining that the node providing the first information is a provisioning feature-supporting node in operation 1010, the provisioner (e.g., the processor 120 of FIG. 1) may provide the provisioning feature to the node providing the first information in operation 1030.

Referring to FIG. 10B, according to an embodiment, the mesh network (e.g., the BLE mesh network 200 of FIG. 2) may include the provisioner 400, the first node 981, and the third node 983 that supports the provisioning feature.

According to an embodiment, the fourth node 984 that does not support the provisioning feature may detect the external device 901 that has entered (or has been included in) the coverage 984a of the fourth node 984. According to an embodiment, the external device 901 may not be included in the coverage 983a of the third node 983 and the coverage 400a of the provisioner 400. The external device 901 may be, e.g., a movable device (e.g., a wearable device worn on the user's body portion). The fourth node 984 detecting the external device 901 may transmit a message containing information indicating that the external device 901 has been detected to the provisioner 400. Based on the message received from the fourth node 984, the provisioner 400 may provide the provisioning feature to the third node 983 that is positioned around (e.g., closest to) the fourth node 984 and that supports the provisioning feature. According to an embodiment, although the external device 901 has not entered yet the coverage 983a of the third node 983, the external device 901 is located in the coverage 984a of the fourth node 984 which is located around the third node 983 and may be predicted to enter the coverage 983a of the third node 983 as the external device 901 moves. According to an embodiment, expandability of the coverage 400a of the provisioner 400 may be increased by providing the provisioning feature to the provisioning feature-supporting node (e.g., the third node 983) in expectation of the movement of the external device 901.

According to an embodiment, although FIGS. 10A and 10B illustrate an embodiment in which the node (e.g., the fourth node 984) that does not support the provisioning feature detects the external device (e.g., the external device 901), this is merely an example. Even when a provisioning feature-supporting node (e.g., the third node 983) detects the external device, the embodiment related to FIGS. 10A and 10B may be applied.

Figure 11A:
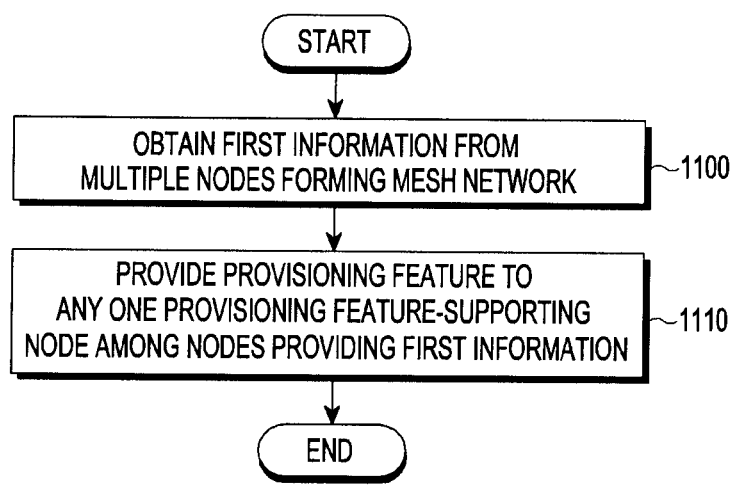
FIG. 11A is a flowchart and FIG. 11B is a diagram illustrating exemplary operations in which a provisioner, after receiving an external device detection message from a first node forming a mesh network, provides a provisioning feature to a node included in the mesh network according to an embodiment.
Figure 11B:
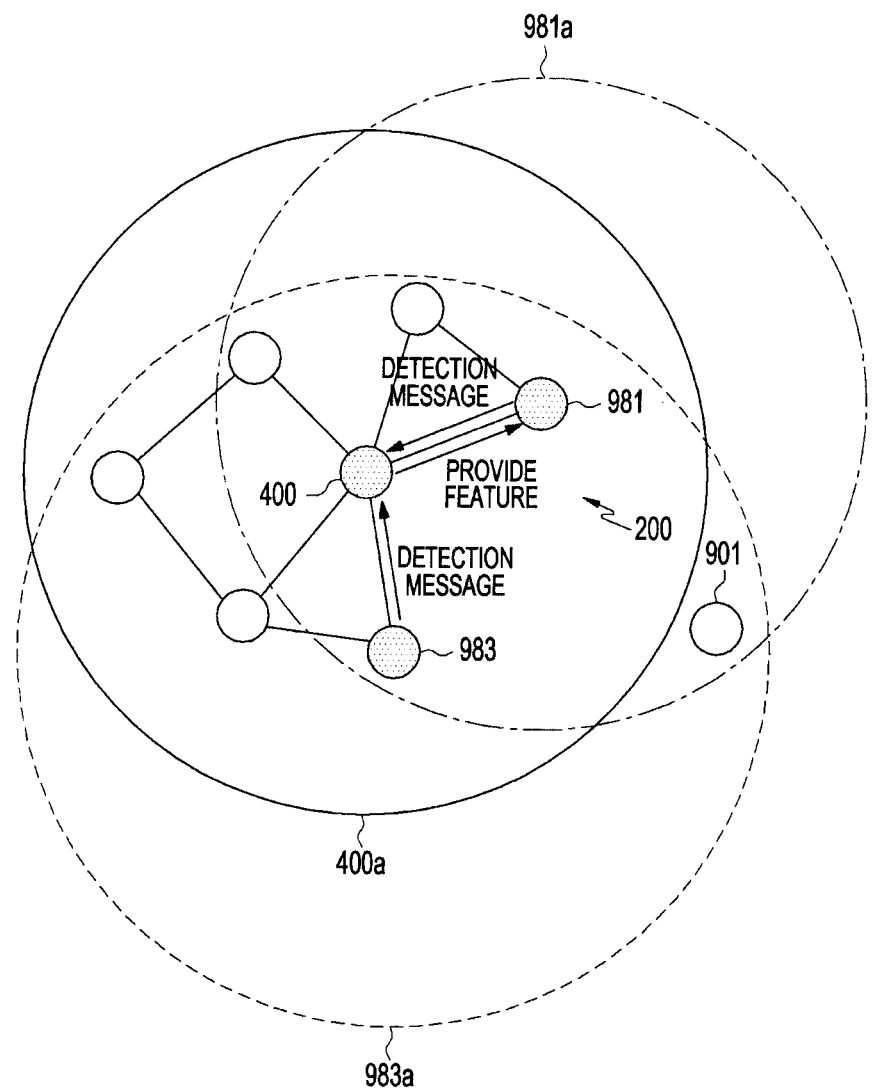

FIG. 11A is a flowchart and FIG. 11B is a diagram illustrating exemplary operations in which a provisioner, after receiving an external device detection message from a first node forming a mesh network, provides a provisioning feature to the mesh network-forming node according to an embodiment.

Referring to FIG. 11A, according to an embodiment, the provisioner (e.g., the provisioner 400 of FIG. 4), in operation 1100, may obtain first information from a plurality of nodes (e.g., the first node 981 and third node 983 of FIG. 10B) forming a mesh network (e.g., the BLE mesh network 200 of FIG. 2) by using a communication module (e.g., the communication module 190 of FIG. 1). According to an embodiment, the first information may include device information (e.g., the UUID and/or OOB information) about an external device (e.g., the external device 901 of FIG. 9) detected by the plurality of nodes. According to an embodiment, the first information may include information indicating that the external device has been detected.

According to an embodiment, the provisioner (e.g., the processor 120 of FIG. 1), in operation 1110, may provide the provisioning feature to any one of the plurality of nodes by using the communication module (e.g., the communication module 190 of FIG. 1).

Referring to FIG. 11B, according to an embodiment, among the plurality nodes forming the mesh network (e.g., the BLE mesh network 200 of FIG. 2), the provisioner 400, the first node 981, and the third node 983 may support the provisioning feature. According to an embodiment, the first node 981 and the third node 983 may provide a detection message indicating the detection of the external device 901 to the provisioner 400. According to an embodiment, the external device 901 is not included in the coverage 400a of the provisioner 400 but may be included in the coverage 981a of the first node 981 and the coverage 983a of the third node 983. The provisioner 400 receiving the detection message may provide the provisioning feature to any one of the first node 981 and the third node 983.

According to an embodiment, the node to which the provisioning feature is provided may be randomly determined. According to an embodiment, the node may be determined based on the distance between the provisioner 400 and the node (e.g., the node closer to the provisioner 400 (e.g., a node located within a designated hop count or less) may be selected). Alternatively, the node to which the provisioning feature is provided may be determined based on various other parameters. According to an embodiment, the provisioner 400 may determine the node to which to provide the provisioning feature based on various parameters, such as the capability of the node (e.g., the hardware/software capability of the node), the user's preference on the node, the user's use history of the node, whether the node is included in the location designated by the user, etc.

Figure 12A:
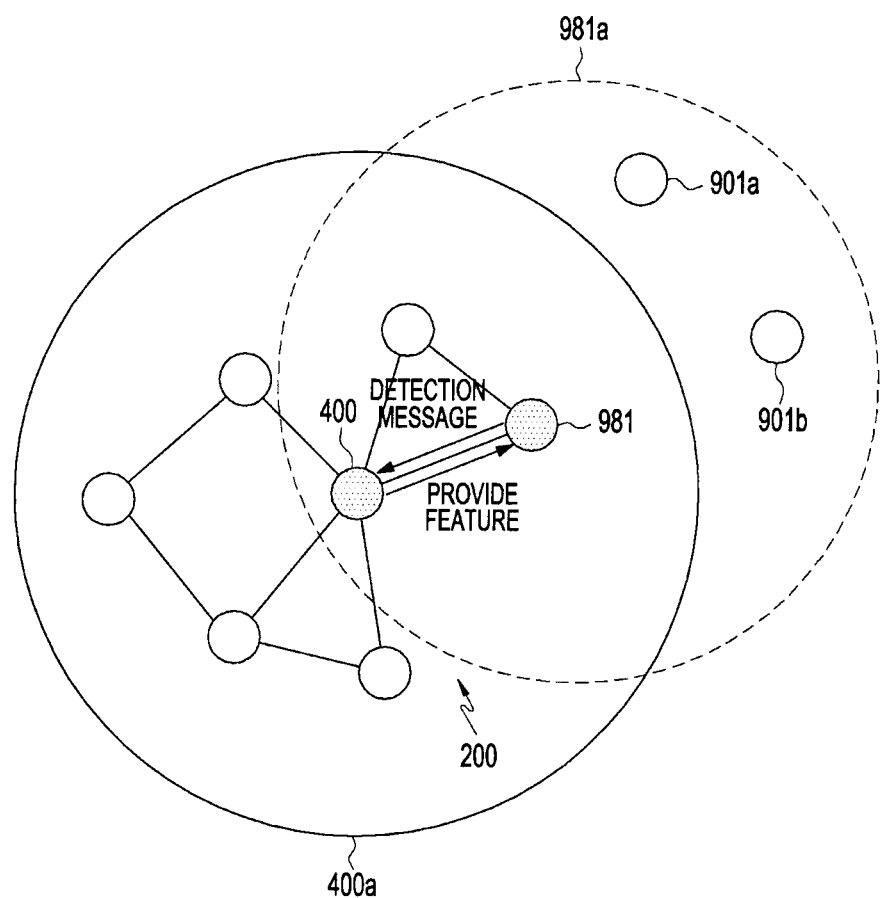
FIG. 12A is a diagram and FIG. 12B is a signal flow diagram illustrating exemplary operations in which a provisioner, after receiving a detection message for a plurality of external devices from a node, provides a provisioning feature to the node according to an embodiment.
Figure 12B:
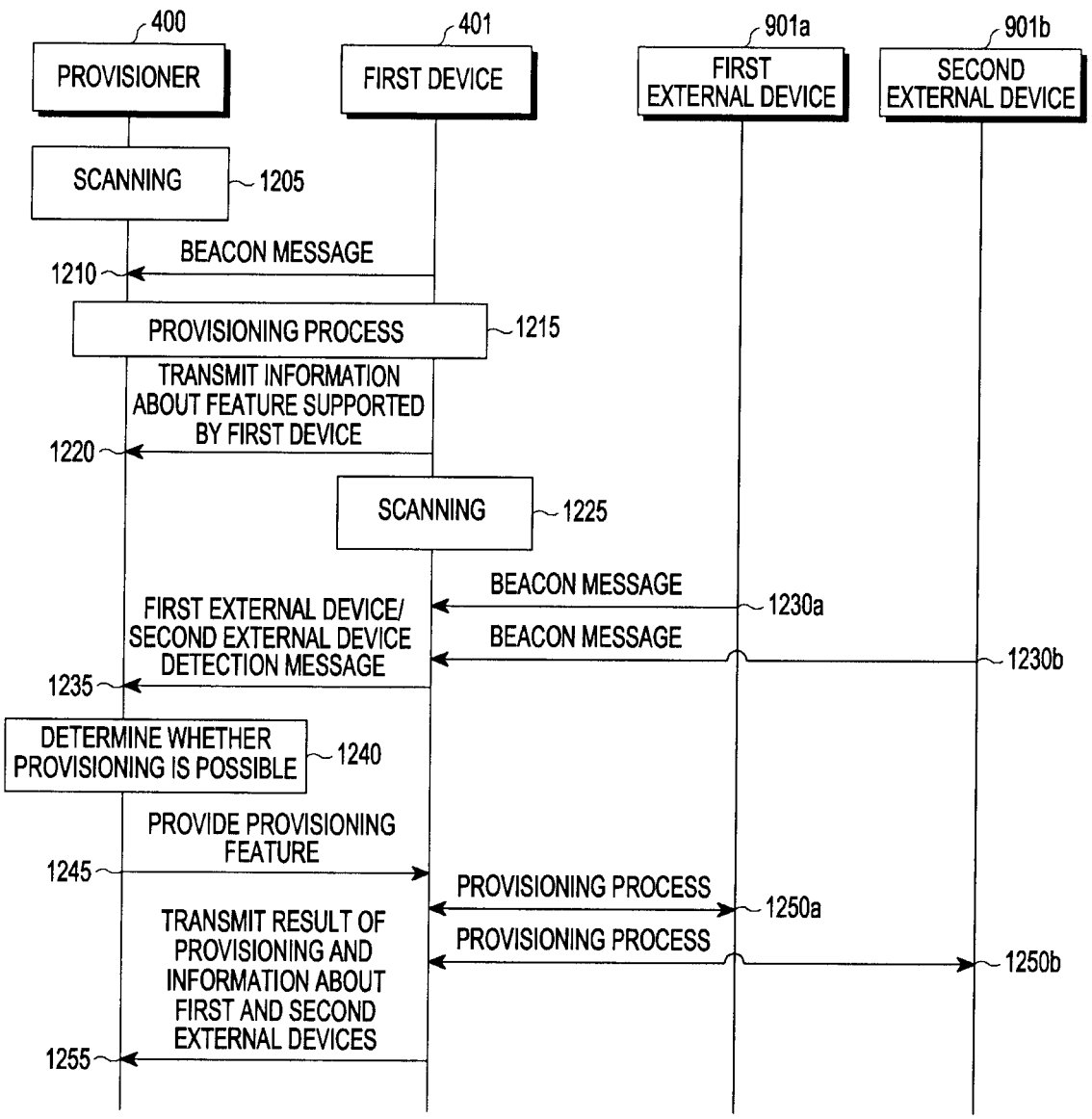

FIG. 12A is a diagram and FIG. 12B is a signal flow diagram illustrating exemplary operations in which a provisioner 400, after receiving a detection message for a plurality of external devices from a node, provides a provisioning feature to the node according to an embodiment.

According to an embodiment, the provisioner 400 may provide the provisioning feature to a node (e.g., the first node 981) detecting a plurality of external devices (e.g., a first external device 901a and/or a second external device 901b). Referring to FIG. 12A, according to an embodiment, the first node 981 detects a plurality of external devices 901a and 901b, which are within the coverage 981a of the first node 981. According to an embodiment, the provisioner 400 may provide the provisioning feature to the first node 981. According to an embodiment, the first node 981 may be a provisioning feature-supporting node. According to an embodiment, the first node 981 may perform a provisioning process on the plurality of external devices 901a and 901b included in the coverage 981a of the first node 981.

FIG. 12B illustrates, in detail, operations of the provisioner 400, the first node 981, and the plurality of external devices 901a and 901b where the plurality of external devices 901a and 901b are detected.

Referring to FIG. 12B, according to an embodiment, the provisioner 400 (e.g., the processor 120 of FIG. 1), in operation 1205, may perform scanning to detect the first device 401 using a communication module (e.g., the communication module 190 of FIG. 1).

According to an embodiment, in operation 1210, the provisioner 400 (e.g., the processor 120 of FIG. 1) may receive a beacon message transmitted from the first device 401 by using the communication module (e.g., the communication module 190 of FIG. 1).

According to an embodiment, the provisioner 400 (e.g., the processor 120 of FIG. 1), in operation 1215, may perform a provisioning process with the first device 401 based on the beacon message received as per operation 1210, by using the communication module (e.g., the communication module 190 of FIG. 1).

According to an embodiment, the provisioner (e.g., the processor 120 of FIG. 1), in operation 1220, may obtain information about at least one feature that the first device 401 supports by using the communication module (e.g., the communication module 190 of FIG. 1).

According to an embodiment, the first device 401, in operation 1225, may perform scanning to detect an external device (e.g., the first external device 901*a* or the second external device 901*b*) by using the communication module of the first device 401.

According to an embodiment, the first device 401, in operations 1230*a* and 1230*b*, may receive beacon messages transmitted from the first external device 901*a* and the second external device 901*b* by using the communication module, thereby detecting the external devices 901*a* and 901*b*.

According to an embodiment, the first device 401, in operation 1235, may transmit a detection message indicating the detection of the first external device 901*a* and the second external device 901*b* to the provisioner 400 by using the communication module.

According to an embodiment, the provisioner 400 (e.g., the processor 120 of FIG. 1), in operation 1240, may determine whether the first device 401 is a device capable of provisioning, e.g., a device supporting the provisioning feature, based on the information obtained as per operation 1220.

According to an embodiment, the provisioner 400 (e.g., the processor 120 of FIG. 1), in operation 1245, may provide the provisioning feature to the first device 401 by using the communication module (e.g., the communication module 190 of FIG. 1) when the first device 401 supports the provisioning feature.

According to an embodiment, the first device 401, in operations 1250*a* and 1250*b*, may perform the provisioning process with the first external device 901*a* and the second external device 901*b* by using the communication module. According to an embodiment, the first device 401, which is in the mesh network, i.e. a mesh network-forming node, may provide the network key of the mesh network (e.g., the BLE mesh network 200 of FIG. 2) and various pieces of information related to the network key (e.g., NID or privacy key) to the first external device 901*a* and the second external device 901*b* through the provisioning process.

According to an embodiment, the first device 401, in operation 1255, may transmit information about the first external device 901*a* and the second external device 901*b* and the result of the provisioning process to the provisioner 400 by using the communication module. As shown in FIG. 12B, when the plurality of external devices 901*a* and 901*b* are detected, the provisioning process may be performed with all of the plurality of external devices 901*a* and 901*b*.

According to an embodiment, some of the operations shown in FIGS. 10A to 12B may be performed before the provisioner receives the detection message for an external device (e.g., the external device 901 of FIG. 9A).

Figure 13A:
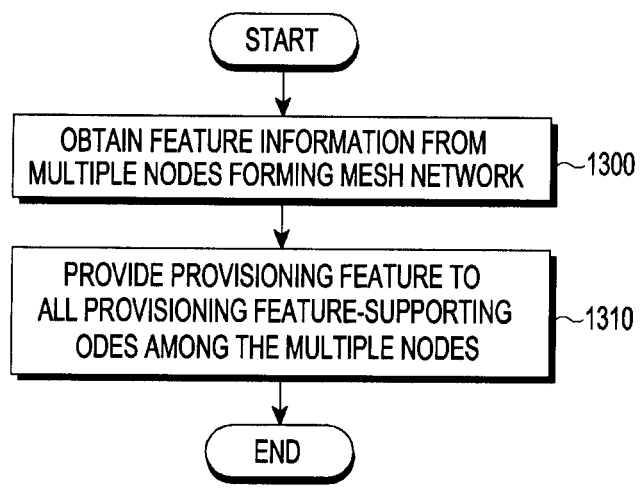
FIG. 13A is a flowchart and FIG. 13B is a diagram illustrating exemplary operations in which a provisioner, before receiving a detection message for a plurality of external devices, provides provisioning features to all of a plurality of nodes supporting the provisioning feature according to an embodiment.
Figure 13B:
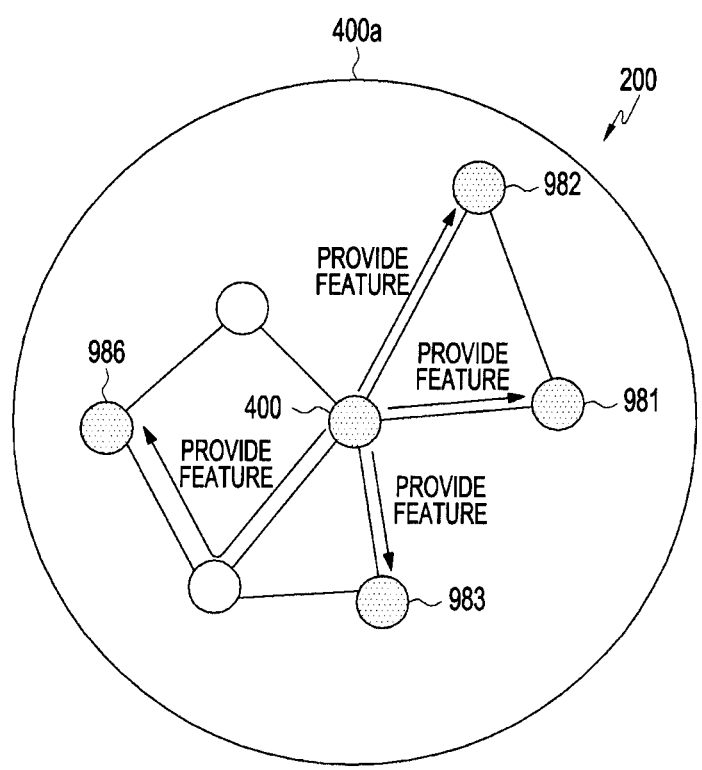

FIG. 13A is a flowchart and FIG. 13B is a diagram illustrating exemplary operations in which a provisioner, before receiving a detection message for a plurality of external devices, provides provisioning features to all of a plurality of nodes supporting the provisioning feature according to an embodiment.

Referring to FIG. 13A, according to an embodiment, the provisioner (e.g., the processor 120 of FIG. 1), in operation 1300, may obtain information about features that a plurality of nodes forming a mesh network (e.g., the BLE mesh network 200 of FIG. 2) support from the plurality of nodes by using a communication module (e.g., the communication module 190 of FIG. 1).

According to an embodiment, the provisioner (e.g., the processor 120 of FIG. 1), in operation 1310, may provide the provisioning feature to all provisioning feature-supporting nodes by using the communication module (e.g., the communication module 190 of FIG. 1).

Referring to FIG. 13B, according to an embodiment, among the plurality nodes forming the mesh network (e.g., the BLE mesh network 200 of FIG. 2), the provisioner 400, the first node 981, the second node 982, the third node 983, and the sixth node 986 may support the provisioning feature. The first node 981, the second node 982, the third node 983, and the sixth node 986 may be included in the coverage 400*a* of the provisioner 400. According to an embodiment, the provisioner 400 may provide the provisioning feature to all provisioning feature-supporting nodes, including the first node 981, the second node 982, the third node 983, and the sixth node 986.

According to an embodiment, in providing the provisioning feature, the provisioner 400 may transmit information regarding the valid period (e.g., 48 hours) of the feature or the number of times in which the feature is valid (e.g., five times) to the provisioning feature-supporting nodes. The node receiving the feature from the provisioner 400 may perform the feature as a provisioner based on the information regarding the valid period of the feature or the number of times in which the feature is valid.

Figure 13C:
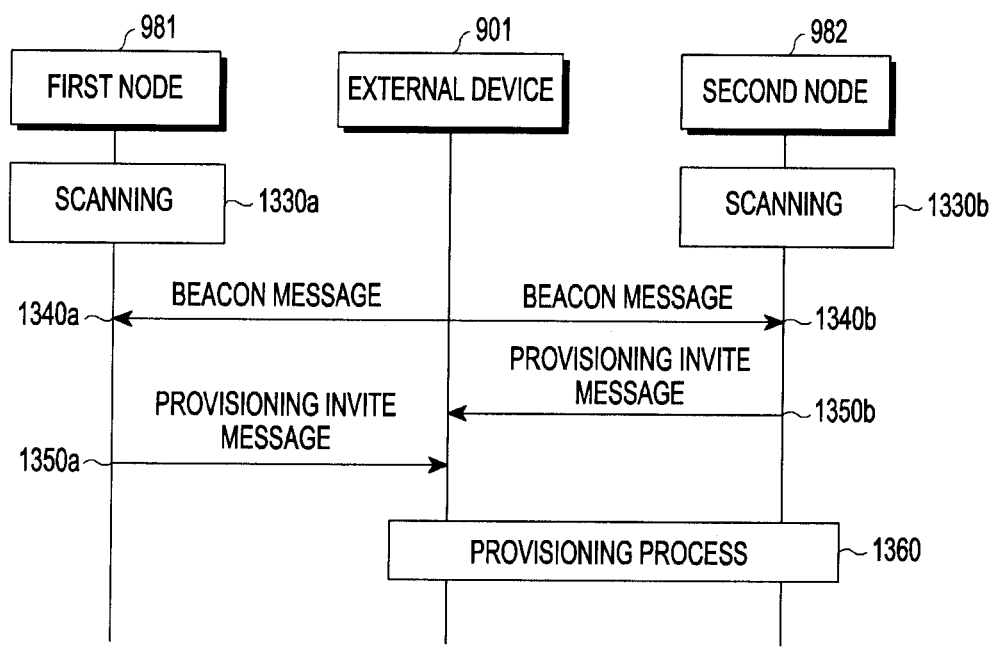
FIG. 13C is a signal flow diagram illustrating exemplary operations in which, upon receiving the provisioning feature, a plurality of provisioning feature-supporting nodes performs a provisioning process with an external device, according to an embodiment.

FIG. 13C is a signal flow diagram illustrating exemplary operations in which, upon receiving the provisioning feature, a plurality of provisioning feature-supporting nodes performs a provisioning process with an external device.

Referring to FIG. 13C, according to an embodiment, the first node 981 and the second node 982 may be nodes that receive the provisioning feature from the provisioner (e.g., the provisioner 400 of FIG. 13B). According to an embodiment, the external device 901 may be a device that does not form the mesh network (e.g., the BLE mesh network 200 of FIG. 2), i.e. outside the mesh network.

According to an embodiment, the first node 981 and the second node 982, in operations 1330*a* and 1330*b*, may perform scanning to detect the external device 901 after having received the provisioning feature from the provisioner 400 by using their communication module.

According to an embodiment, the first node 981 and the second node 982, in operations 1340*a* and 1340*b*, may receive beacon messages transmitted from the external device 901 by using their communication module.

According to an embodiment, the second node 982, in operation 1350*b*, may transmit a provisioning invite message to the external device 901 by using their communication module.

According to an embodiment, the first node 981, in operation 1350*a*, may transmit a provisioning invite message to the external device 901 by using its communication module.

According to an embodiment, the second node 982, in operation 1360, may perform the provisioning process with the external device 901 by using the communication module.

According to an embodiment, the device performing the provisioning process may not be able to simultaneously perform the provisioning process with another device. For example, the second node 982 which has first transmitted the provisioning invite message to the external device 901 may perform the provisioning process with the external device 901. According to an embodiment, the external device 901 may disregard the provisioning invite message transmitted from the first node 981.

Figure 14A:
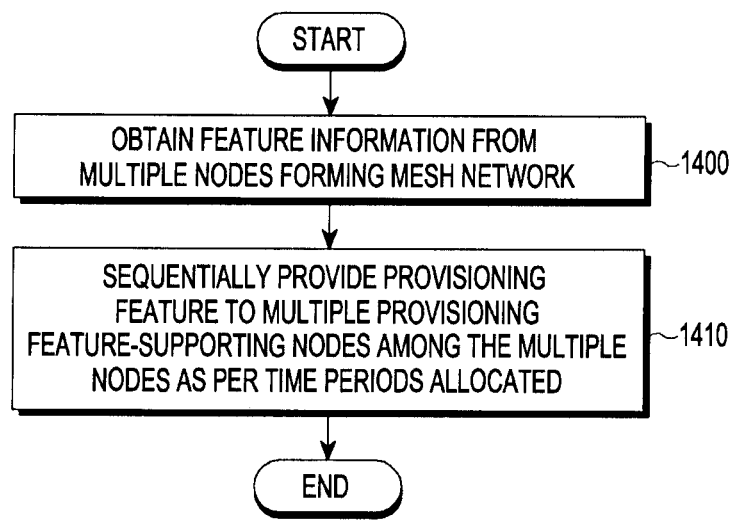
FIG. 14A is a flowchart and FIG. 14B is a diagram illustrating exemplary operations in which a provisioner, before receiving an external device detection message, sequentially provides provisioning features to a plurality of nodes forming a mesh network as per designated time periods according to an embodiment.
Figure 14B:
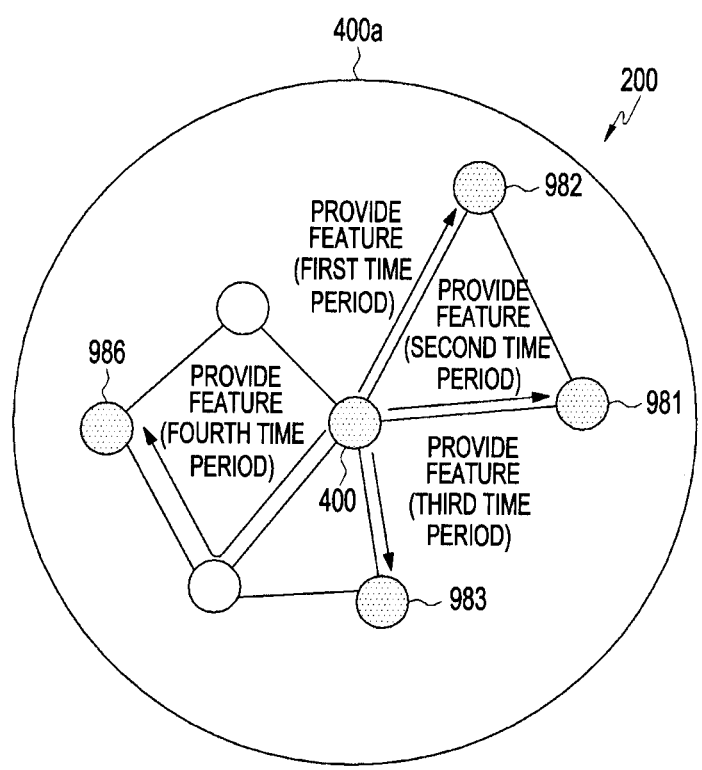

FIG. 14A is a flowchart and FIG. 14B is a diagram illustrating exemplary operations in which a provisioner, before receiving an external device detection message, sequentially provides provisioning features to a plurality of nodes forming a mesh network (e.g., the BLE mesh network 200 of FIG. 2) as per designated time periods according to an embodiment.

According to an embodiment, the provisioner (e.g., the processor 120 of FIG. 1), in operation 1400, may obtain information about features that a plurality of nodes forming a mesh network (e.g., the BLE mesh network 200 of FIG. 2) support from the plurality of nodes by using a communication module (e.g., the communication module 190 of FIG. 1).

According to an embodiment, the provisioner 400 (e.g., the processor 120 of FIG. 1), in operation 1410, may sequentially provide, as per designated time periods, the provisioning feature to a plurality of provisioning feature-supporting nodes among the plurality of nodes by using the communication module (e.g., the communication module 190 of FIG. 1).

Referring to FIG. 14B, according to an embodiment, among the plurality nodes forming the mesh network (e.g., the BLE mesh network 200 of FIG. 2), the provisioner 400, the first node 981, the second node 982, the third node 983, and the sixth node 986 may support the provisioning feature. According to an embodiment, the first node 981, the second node 982, the third node 983, and the sixth node 986 may be included in the coverage 400a of the provisioner 400. According to an embodiment, the provisioner 400 may sequentially provide the provisioning feature to the provisioning feature-supporting nodes as per designated (or allocated) time periods. According to an embodiment, a first time period to a fourth time period may be time periods set at, e.g., 12-hour intervals, but this is merely an example, and embodiments of the disclosure are not limited thereto.

According to an embodiment, information about the time periods may simultaneously be transmitted to all the provisioning feature-supporting nodes (e.g., the first node 981, the second node 982, the third node 983, and the sixth node 986). According to an embodiment, the provisioning feature may simultaneously be transmitted to all the provisioning feature-supporting nodes (e.g., the first node 981, the second node 982, the third node 983, and the sixth node 986), or time period information along with the provisioning feature may be transmitted to the provisioning feature-supporting nodes. According to an embodiment, the nodes (e.g., the first node 981, the second node 982, the third node 983, and the sixth node 986) receiving the provisioning feature may be set to sequentially activate the provisioning feature as per the designated time periods. According to an embodiment, the time period information may not be transmitted to the provisioning feature-supporting nodes (e.g., the first node 981, the second node 982, the third node 983, and the sixth node 986), and the provisioner 400 may sequentially provide the provisioning feature to each node as per the designated time periods.

Figure 15:
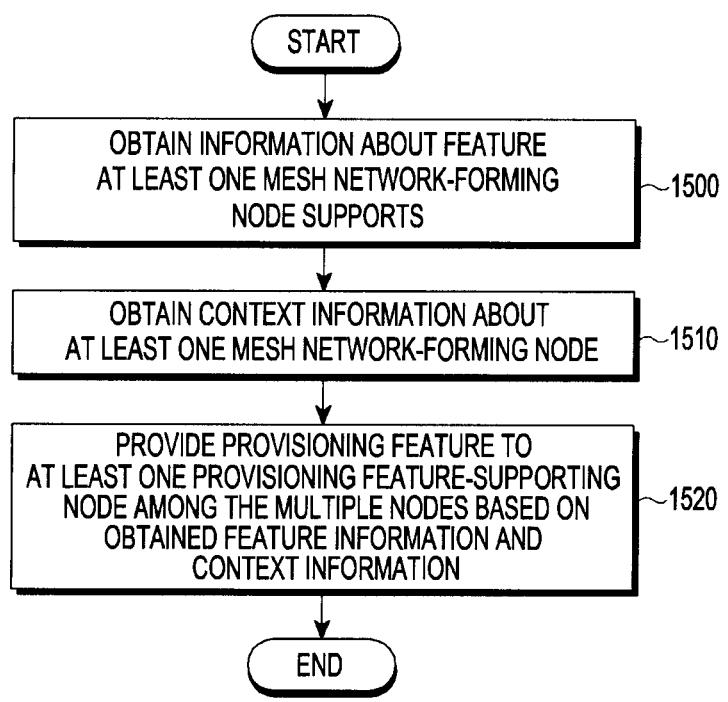
FIG. 15 is a flowchart illustrating exemplary operations in which a provisioner, before receiving a detection message for a plurality of external devices, provides provisioning features to nodes forming a mesh network based on context information according to an embodiment.

FIG. 15 is a flowchart illustrating exemplary operations in which a provisioner, before receiving a detection message for a plurality of external devices, provides provisioning features to nodes forming a mesh network (e.g., the BLE mesh network 200 of FIG. 2) based on context information according to an embodiment.

According to an embodiment, the provisioner (e.g., the processor 120 of FIG. 1), in operation 1500, may obtain information about features that at least one node supports from at least one mesh network-forming node by using a communication module (e.g., the communication module 190 of FIG. 1).

According to an embodiment, the provisioner (e.g., the processor 120 of FIG. 1), in operation 1510, may obtain context information about at least one mesh network-forming node by using the communication module (e.g., the communication module 190 of FIG. 1). According to an embodiment, the context information may include information such as the number of times in which a particular node has performed the provisioning process or the number of times in which a particular node has received a mesh message from another mesh network-forming node.

According to an embodiment, the provisioner (e.g., the processor 120 of FIG. 1), in operation 1520, may provide the provisioning feature to at least one node with the provisioning feature among the plurality of devices based on the context information received as per operation 1510 and by using the communication module (e.g., the communication module 190 of FIG. 1). According to an embodiment, the provisioner (e.g., the provisioner 400 of FIG. 4) may determine priorities in ascending or descending order based on the number of times in which a particular node has performed the provisioning process or the number of times in which a particular node has received a mesh message from another mesh network-forming node. According to an embodiment, the provisioner may sequentially provide the provisioning feature to the provisioning feature-supporting nodes according to the determined priorities.

According to an embodiment, the device first receiving a user input to form the mesh network (e.g., the BLE mesh network 200 of FIG. 2) may be determined to be the first provisioner (e.g., the provisioner at the time when the mesh network is first formed). According to an embodiment, the node designated as the provisioner may be changed according to user input or the provisioner may be reset. For example, the first node (e.g., the first node 981 of FIG. 9A) may be first designated as the provisioner, but later the second node (e.g., the second node 982 of FIG. 9A) may be designated as the provisioner according to user input. According to an embodiment, among the mesh network-forming devices, any one designated device may first be determined to be the provisioner.

According to an embodiment, at least some of the operations shown in FIGS. 13A to 15 may also be performed after the provisioner receives a detection message for an external device.

Figure 16A:
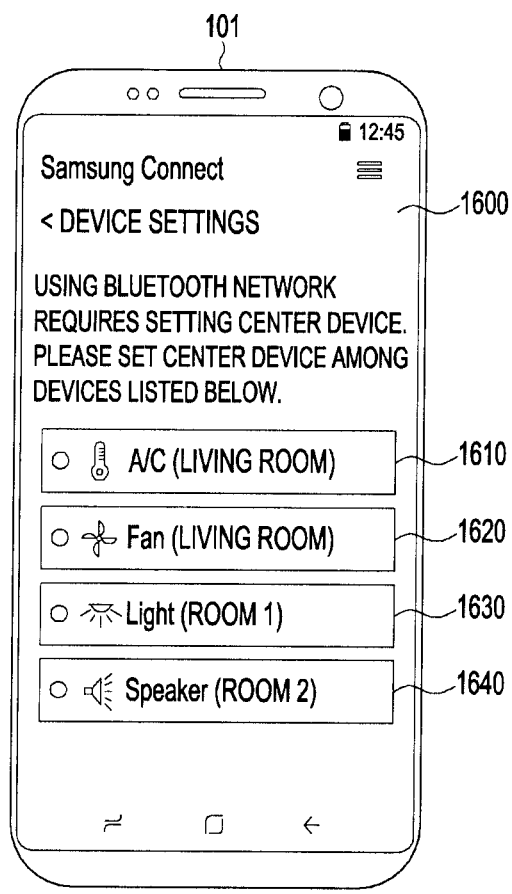
FIG. 16A, FIG. 16B and FIG. 16C are views illustrating an exemplary operation for determining a device to serve as a provisioner by a user input according to an embodiment.
Figure 16B:
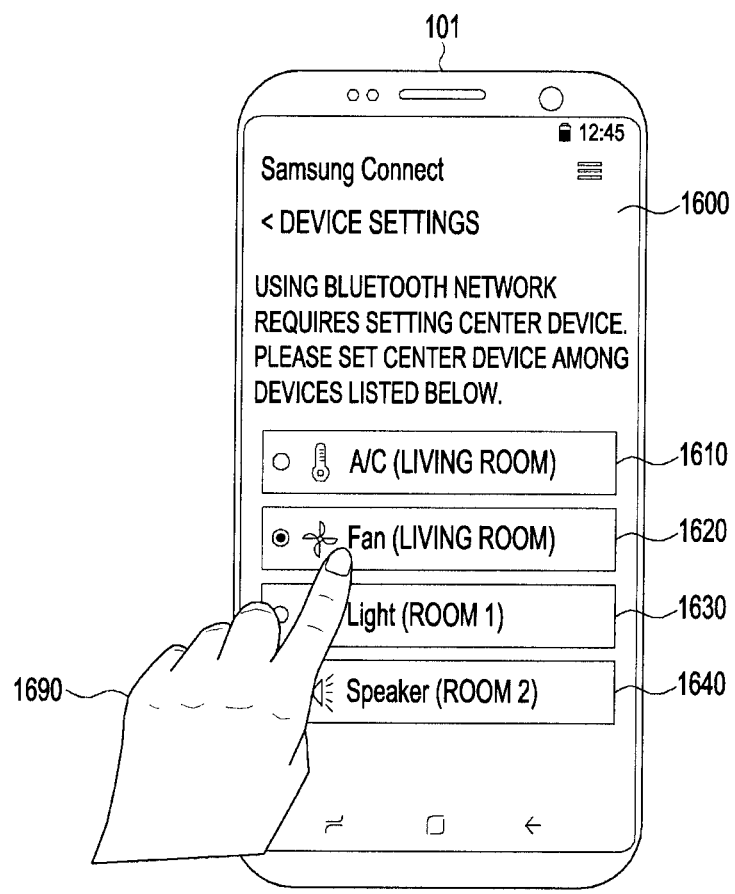
Figure 16C:
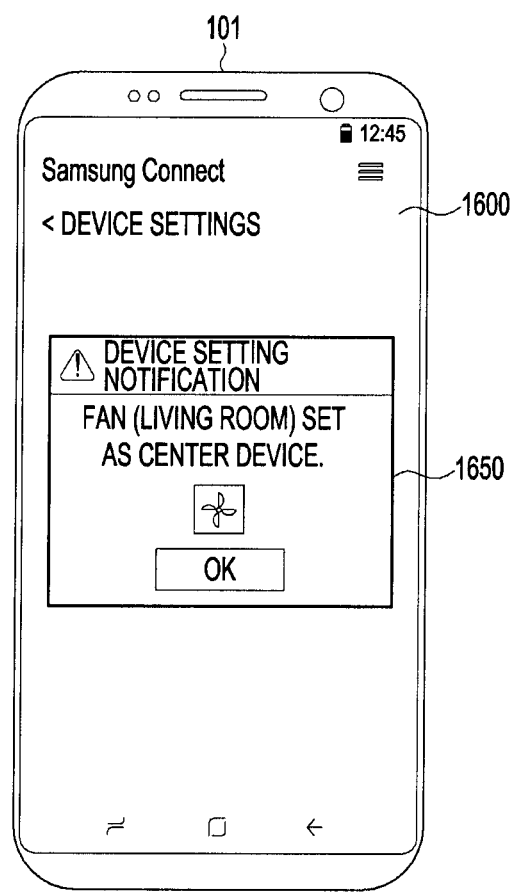

FIGS. 16A to 16C are views illustrating an exemplary operation for determining, by user input, a device to serve as a provisioner according to an embodiment. FIGS. 16A to 16C illustrate embodiments in which the provisioner (e.g., the provisioner 400 of FIG. 4) is first determined as per user input or, when an electronic device (e.g., the electronic device 101 of FIG. 1) is already set as the provisioner, the provisioner is changed (or reset) as per user input.

Referring to FIG. 16A, according to an embodiment, to determine a device to operate as the provisioner, the electronic device 101 may display at least one device (e.g., an air conditioner 1610, a fan 1620, a lamp 1630, or a speaker 1640) obtained through wireless or wired communication with the electronic device 101 on the screen of a designated application (e.g., Samsung Connect™).

Referring to FIG. 16B, according to an embodiment, the electronic device 101 may receive the selection input of a user 1690 on any one device (e.g., the fan 1620) among the at least one displayed device (e.g., the air conditioner 1610, the fan 1620, the lamp 1630, or the speaker 1640).

Referring to FIG. 16C, according to an embodiment, the electronic device 101 may display a notification message 1650 to indicate that the fan 1620 has been set (or reset) as the provisioner (e.g., the provisioner 400 of FIG. 4) as per the selection input of the user 1690 as shown in FIG. 16B.

Figure 17A:
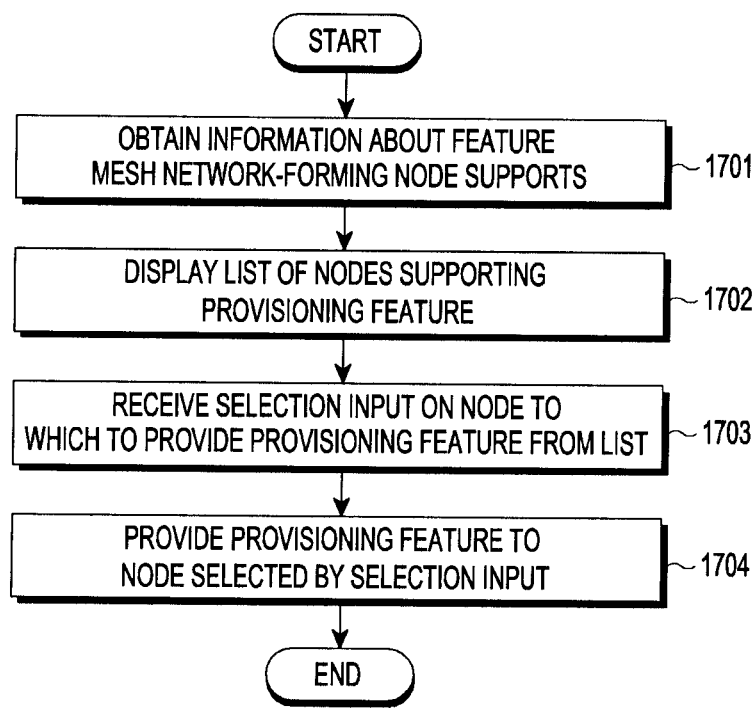
FIG. 17A is a flowchart and FIG. 17B, FIG. 17C and FIG. 17D are views illustrating an exemplary operation in which a provisioning feature is provided to any one of a plurality of nodes supporting a provisioning feature by a user input according to an embodiment.
Figure 17B:
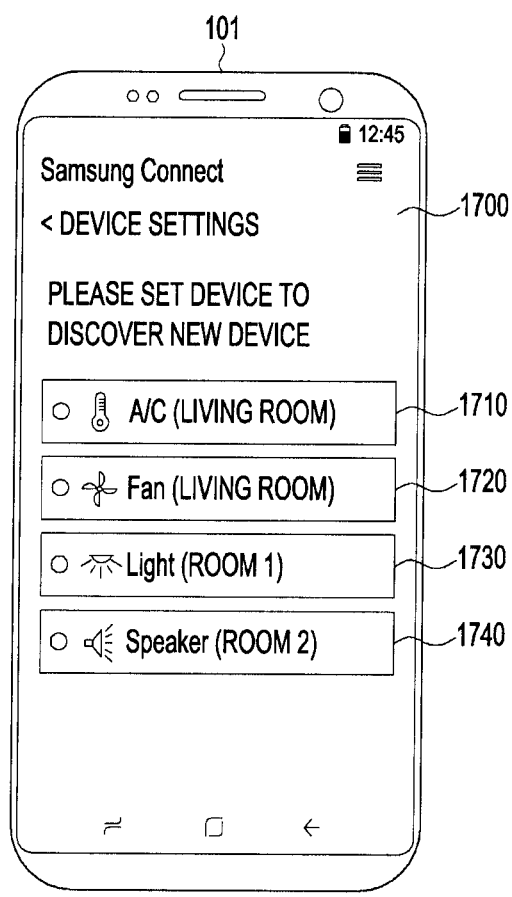
Figure 17C:
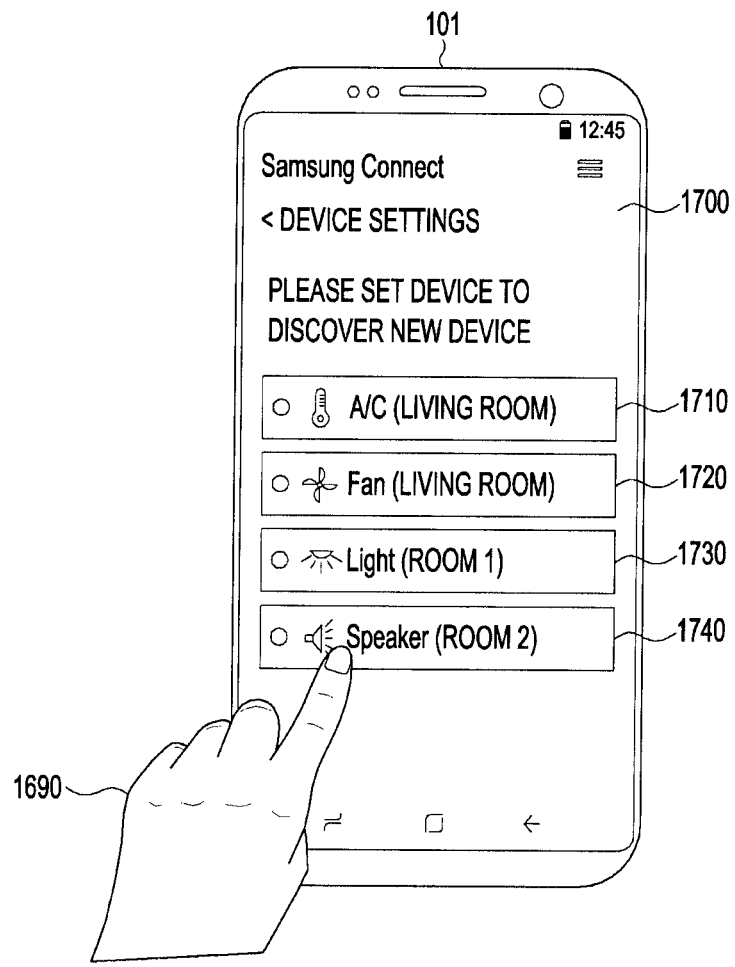
Figure 17D:
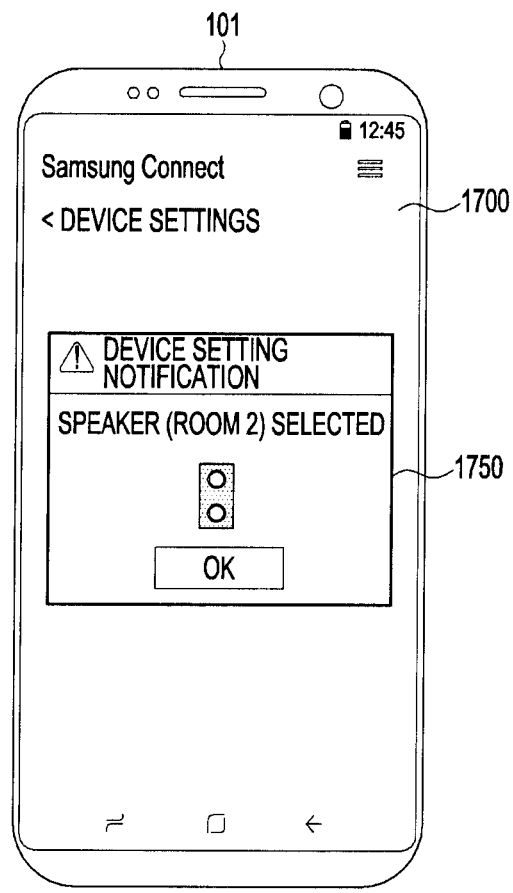

FIG. 17A is a flowchart and FIGS. 17B to 17D are views illustrating an exemplary operation in which a provisioning feature is provided to any one of a plurality of nodes supporting a provisioning feature by a user input according to an embodiment. Various embodiments shown in FIGS. 17A to 17D may be performed before or after the provisioner (e.g., the provisioner 400 of FIG. 4) receives a detection message transmitted from an external device.

According to an embodiment, the provisioner (e.g., the processor 120 of FIG. 1), in operation 1701, may obtain information about features that a node forming a mesh network (e.g., the BLE mesh network 200 of FIG. 2) supports by using a communication module (e.g., the communication module 190 of FIG. 1).

According to an embodiment, the provisioner (e.g., the processor 120 of FIG. 1), in operation 1702, may display a list of provisioning feature-supporting nodes using a display (e.g., the display device 160 of FIG. 1).

According to an embodiment, the provisioner (e.g., the processor 120 of FIG. 1), in operation 1703, may receive a selection input on a node to which to provide the provisioning feature from the list by using the display (e.g., the display device 160 of FIG. 1).

According to an embodiment, the provisioner (e.g., the processor 120 of FIG. 1), in operation 1704, may provide the provisioning feature to the node selected as per the selection input by using the communication module (e.g., the communication module 190 of FIG. 1).

Referring to FIG. 17B, according to an embodiment, the provisioner (e.g., the electronic device 101) may display a list of provisioning feature-supporting nodes (e.g., an air conditioner 1710, a fan 1720, a lamp 1730, or a speaker 1740).

Referring to FIG. 17C, according to an embodiment, the provisioner (e.g., the electronic device 101) may receive the selection input of a user 1690 on at least one node to which to provide the provisioning feature. Although FIG. 17C illustrates an embodiment in which one node (e.g., the speaker 1740) is selected, the provisioner may receive selection inputs on a plurality of nodes according to an embodiment.

Referring to FIG. 17D, according to an embodiment, the provisioner (e.g., the electronic device 101) may display a notification message 1750 to indicate that the speaker 1740 has been set as the node to which to provide the provisioning feature as per the selection of the user 1690 as shown in FIG. 17C.

Figure 18:
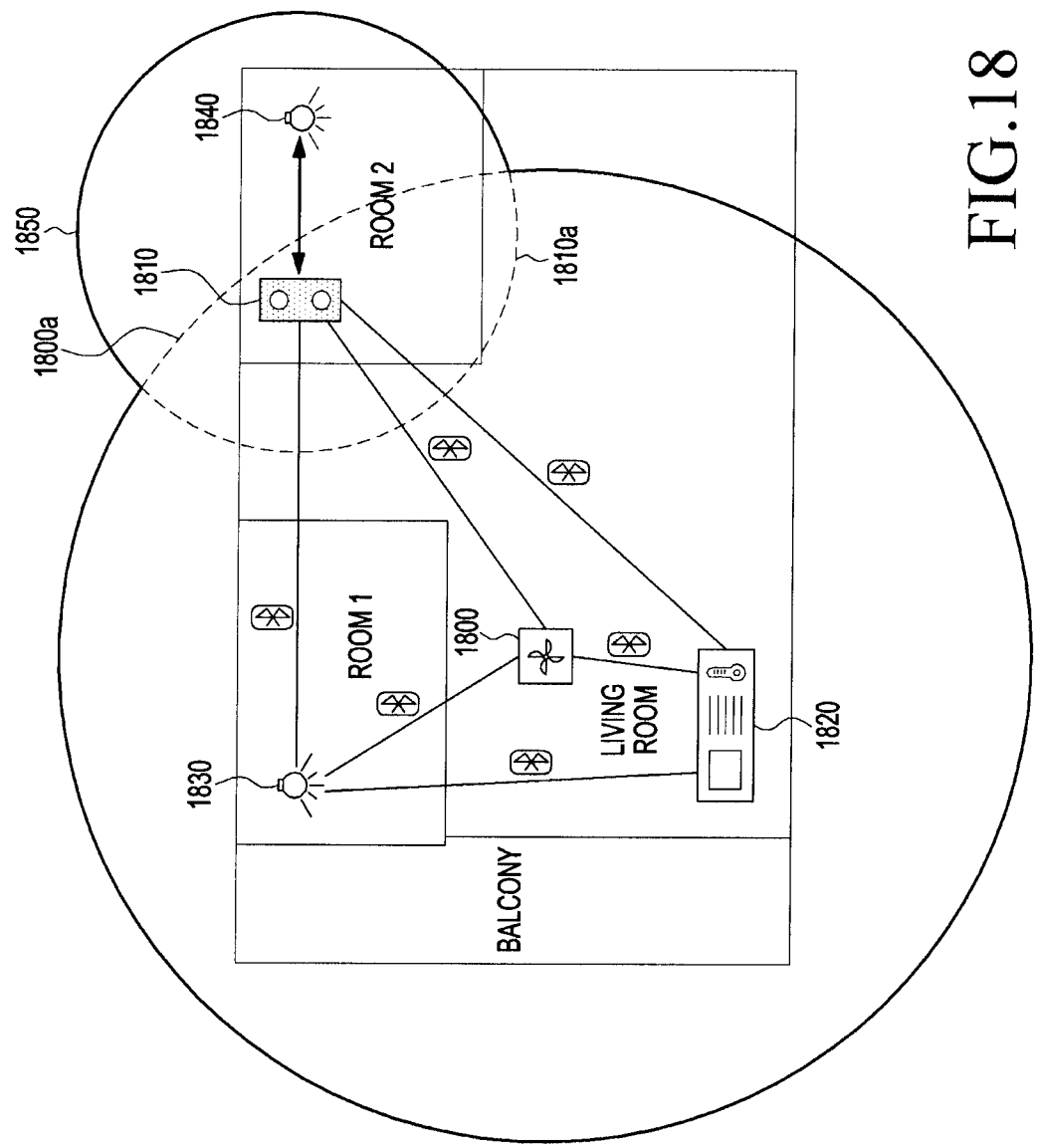
FIG. 18 is a view illustrating an exemplary operation for substantially expanding the coverage of a provisioner by a node that receives a provisioning feature in a house according to an embodiment.

FIG. 18 is a view illustrating an exemplary operation for substantially expanding the coverage of a provisioner by a node that receives a provisioning feature in a house according to an embodiment.

Referring to FIG. 18, various embodiments of the disclosure above may apply to a home. FIG. 18 illustrates an example in which a fan 1800 in the living room is determined to be the provisioner (e.g., the provisioner 400) as per the user's selection. According to an embodiment, various electronic devices (e.g., a speaker 1810, an air conditioner 1820, and a lamp 1830) may be included in the coverage 1800a of the fan 1800. According to an embodiment, the fan 1800 may form a mesh network (e.g., a BLE mesh network) with various electronic devices (e.g., the speaker 1810, the air conditioner 1820, and the lamp 1830). After forming the mesh network, a new lamp 1840 may be installed in room 2. The newly installed lamp 1840 is included in the coverage 1810a of the speaker 1810 that supports the provisioning feature but not in the coverage 1800a of the fan 1800. For example, the speaker 1810 may receive the provisioning feature from the fan 1800 and may perform a provisioning process on the newly installed lamp 1840. By the provisioning process, the newly installed lamp 1840 may be included as a mesh network-forming node by the speaker 1810. Accordingly, the user may control the newly installed lamp 1840 via the fan 1800 (e.g., by operating a switch of the fan 1800).

According to an embodiment, various embodiments described above in connection with FIGS. 9A to 17D may apply to various devices located in a home. For example, the fan 1800, which is set as the provisioner, may provide the provisioning feature to the air conditioner 1820 which is positioned closest to the fan 1800. According to an embodiment, the fan 1800 set as the provisioner may provide the provisioning feature to the device most frequently used by the user among the devices in home, e.g., the lamp 1830 in room 1. Additionally, various embodiments of the disclosure may be applicable to home devices (e.g., the speaker 1810, the air conditioner 1820, or the lamp 1830).

In connection with FIG. 18, such an example has been described where the device receiving the provisioning feature from the provisioner (e.g., the fan 1800) is a stationary device (e.g., the speaker 1810). According to an embodiment, the device receiving the provisioning feature may be a movable device (e.g., the user's smartphone).

In another home example, an intercom (not shown) may be set as the provisioner in the house. The user may newly install a lock device (not shown) to lock the door of room 2. The user may attempt to scan the lock via the intercom, so that the lock can be included in the mesh network. However, direct provisioning process via the intercom may fail due to the long distance between the intercom and the lock device. The lock device may be included in the coverage of a computer (not shown) supporting the provisioning feature in room 2, and the computer may detect the lock device and transmit a result of detecting the lock device to the intercom in a mesh message. The intercom may provide the provisioning feature to the computer in room 2, and the computer may perform the provisioning process on the lock device. By such operations, the lock device may be included in the home mesh network, and the user may lock or unlock the lock device using his smartphone.

According to an embodiment, an electronic device may comprise a wireless communication circuit (e.g., the wireless communication module 192 of FIG. 1) configured to provide Bluetooth low energy (BLE) wireless communication (e.g., the BLE mesh network 200 of FIG. 2) and a control circuit (e.g., the processor 192 of FIG. 1) operably connected with the wireless communication circuit; the control circuit configured to form a mesh network (e.g., the BLE mesh network 200 of FIG. 2) with a plurality of devices using the wireless communication circuit, where a provisioning process (e.g., the provisioning process 470 of FIG. 4) is performed so that each of the plurality of devices is a node over the mesh network, to receive, from a first device among the plurality of devices (e.g., the first device 401 after the provisioning process 470 has been performed in FIG. 4), first information including first identification information associated with the first device and second identification information associated with a second external device (e.g., the external device 901 of FIG. 9A) outside the mesh network, to determine whether the first device is able to perform the provisioning process, when the first device is determined to be able to perform the provisioning process, to provide, to the first device, an authorization that allows performance of the provisioning process on the second device by the first device, and to receive, from the first device, second information including a result of the provisioning process on the second external device and device information associated with the second external device.

According to an embodiment, the provisioning process may include provision of a network key (e.g., the network key included in the network key field 861 of FIG. 8B) to a device to be added to the mesh network.

According to an embodiment, the network key used in the provisioning process of the first device may be same as the network key used in the provisioning process of the second external device.

According to an embodiment, the control circuit may be configured to, after receiving the second information, receive a message (e.g., an advertisement message) from the second external device through the first device.

According to an embodiment, the control circuit may be configured to provide the authorization that allows performance of the provisioning process on the second external device by the first device when the second external device is outside a coverage of the electronic device.

According to an embodiment, the control circuit may be configured to receive, from a third device in the mesh network (e.g., the first device 401 after the provisioning process 470 has been performed in FIG. 4), third identification information associated with the third device and fourth identification information associated with a fourth external device (e.g., the external device 901 of FIG. 9A) outside the mesh network, and to provide, to the third device, another authorization that allows performance of the provisioning process on the fourth external device by the third device.

According to an embodiment, the control circuit may be configured to receive, from a third device in the mesh network, third identification information associated with the third device and fourth identification information associated with a fourth external device outside the mesh network, sequentially provide, to the first device, the authorization that allows performance of the provisioning process on the second external device by the first device, and, to the third device, another authorization that allows performance of the provisioning process on the fourth external device by the third device, as per designated time periods.

According to an embodiment, the control circuit may be configured to, when the first device is determined to not be able to perform the provisioning process, provide the authorization to a fifth device positioned adjacent to the first device.

According to an embodiment, the control circuit may be configured to receive information about at least one feature that each of the plurality of devices supports from the plurality of devices by using the wireless communication circuit.

According to an embodiment, there is provided a computer-readable recording medium storing instructions that are executed by a processor to perform at least one operation, the at least one operation comprising forming a mesh network with a plurality of devices (e.g., the first device 401 after the provisioning process 470 has been performed in FIG. 4) by using the wireless communication circuit, where a provisioning process is performed so that each of the plurality of devices is a node over the mesh network, receiving, from a first device among the plurality of devices, first information including first identification information associated with the first device and second identification information associated with a second external device outside the mesh network, determining whether the first device is able to perform the provisioning process, when the first device is determined to be able to perform the provisioning process, providing, to the first device, an authorization that allows performance of the provisioning process on the second device by the first device, and receiving, from the first device, second information including a result of the provisioning process on the second external device and device information associated with the second external device.

According to an embodiment, an electronic device may comprise a wireless communication circuit configured to provide BLE wireless communication, a memory configured to store first identification information associated with the electronic device, and a control circuit operably connected with the wireless communication circuit and the memory, the control circuit configured to, using the wireless communication circuit, join the electronic device in a mesh network via a provisioning process, so that the electronic device is a node in the mesh network, where the mesh network includes a first device as a provisioner, to receive, from a second external device outside the mesh network, second identification information associated with the second external device, to transmit the second identification information to the first device through the wireless communication circuit, to receive an authorization that allows performance of the provisioning process on the second external device from the first device through the wireless communication circuit, to perform the provisioning process on the second external device through the wireless communication circuit, and to transmit, to the first device, information including device information associated with the second external device and a result of the provisioning process on the second external device through the wireless communication circuit.

According to an embodiment, the control circuit may be configured to provide information about at least one feature that the electronic device supports to the first device through the wireless communication circuit.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry." A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

As is apparent from the foregoing description, according to various embodiments of the disclosure, an external device, which is not included in the coverage of the provisioner, may be included in a mesh network as a node of the mesh network (e.g., a BLE mesh network). In another aspect of the various embodiments, the coverage of the provisioner may be substantially expanded, thereby enhancing the convenience of users of the mesh network.

The effects set forth herein are not limited thereto, and it is apparent to one of ordinary skill in the art that various effects may be disclosed herein.

Certain of the above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein.

While the disclosure has been shown and described with reference to certain exemplary embodiments thereof, it will be understood by those skilled in the art that various changes in form and details may be made therein without departing from the spirit and scope of the disclosure as defined by the appended claims and their equivalents.

What is claimed is:

1. An electronic device, comprising:
    a wireless communication circuit configured to provide Bluetooth low energy (BLE) wireless communication; and
    a control circuit operably connected with the wireless communication circuit, the control circuit configured to:

form a mesh network with a plurality of devices in a coverage of a scanning of the electronic device using the wireless communication circuit, wherein a provisioning process is performed so that each of the plurality of devices is a node in the mesh network, receive, from a first device among the plurality of devices, first information including first identification information associated with the first device and second identification information associated with a second external device outside the coverage of the scanning, determine whether the first device is able to perform the provisioning process, when the first device is determined to be able to perform the provisioning process, provide, to the first device, a role that allows performance of the provisioning process on the second external device by the first device, and receive, from the first device, second information including a result of the provisioning process on the second external device and device information associated with the second external device.

2. The electronic device of claim 1, wherein the provisioning process includes provision of a network key to a device to be added to the mesh network.

3. The electronic device of claim 2, wherein the network key used in the provisioning process of the first device is same as the network key used in the provisioning process of the second external device.

4. The electronic device of claim 1, wherein the control circuit is further configured to, after reception of the second information, receive a message from the second external device through the first device.

5. The electronic device of claim 1, wherein the control circuit is further configured to:
receive, from a third device in the mesh network, third identification information associated with the third device and fourth identification information associated with a fourth external device outside the mesh network, and
provide, to the third device, another role that allows performance of the provisioning process on the fourth external device by the third device.

6. The electronic device of claim 1, wherein the control circuit is further configured to:
receive, from a third device in the mesh network, third identification information associated with the third device and fourth identification information associated with a fourth external device outside the mesh network,
sequentially provide, to the first device, the role that allows performance of the provisioning process on the second external device by the first device, and, to the third device, another role that allows performance of the provisioning process on the fourth external device by the third device, as per designated time periods.

7. The electronic device of claim 1, wherein the control circuit is further configured to, when the first device is determined to not be able to perform the provisioning process, provide the role to a fifth device positioned adjacent to the first device.

8. The electronic device of claim 1, wherein the control circuit is further configured to receive information about at least one feature that each of the plurality of devices supports from the plurality of devices using the wireless communication circuit.

9. A non-transitory computer-readable recording medium in an electronic device storing instructions that are executed by a processor to perform at least one operation, the at least one operation comprising:
forming a mesh network with a plurality of devices, wherein a provisioning process is performed so that each of the plurality of devices is a node in the mesh network;
receiving, from a first device among the plurality of devices in a coverage of a scanning of the electronic device, first information including first identification information associated with the first device and second identification information associated with a second external device outside the coverage of the scanning;
determining whether the first device is able to perform the provisioning process;
when the first device is determined to be able to perform the provisioning process, providing, to the first device, a role that allows performance of the provisioning process on the second external device by the first device; and
receiving, from the first device, second information including a result of the provisioning process on the second device and device information associated with the second device.

10. The non-transitory computer-readable recording medium of claim 9, wherein the provisioning process includes provision of a network key to a device to be added to the network.

11. The non-transitory computer-readable recording medium of claim 10, wherein the network key used in the provisioning process of the first device is same as the network key used in the provisioning process of the second device.

12. The non-transitory computer-readable recording medium of claim 9, wherein the at least one operation further comprises, after receiving a message from the first device, receiving a message from the second device through the first device.

13. The non-transitory computer-readable recording medium of claim 9, wherein the at least one operation further comprises:
providing the role that allows performance of the provisioning process on the second external device by the first device when the second external device is outside the coverage of the scanning of the electronic device.

14. The non-transitory computer-readable recording medium of claim 9, wherein the at least one operation further comprises:
receiving, from a third device in the mesh network, third identification information associated with the third device and fourth identification information associated with a fourth device outside the mesh network; and
providing, to the third device, another role that allows performance of the provisioning process on the fourth device by the third device.

15. The non-transitory computer-readable recording medium of claim 9, wherein the at least one operation further comprises:
receiving, from a third device in the mesh network, third identification information associated with the third device and fourth identification information associated with a fourth device outside the mesh network; and
sequentially providing, to the first device, the role that allows performance of the provisioning process on the second device by the first device, and, to the third device, another role that allows performance of the provisioning process on the fourth device by the third device, as per designated time periods.

16. The non-transitory computer-readable recording medium of claim 9, wherein the at least one operation further comprises:
when the first device is determined to not be able to perform the provisioning process, providing the role to a fifth device positioned adjacent to the first device.

17. The non-transitory computer-readable recording medium of claim 9, wherein the at least one operation further comprises receiving information about at least one feature that each of the plurality of devices supports from the plurality of devices.

18. An electronic device, comprising:
a wireless communication circuit configured to provide BLE wireless communication;
a memory configured to store first identification information associated with the electronic device; and
a control circuit operably connected with the wireless communication circuit and the memory, the control circuit configured to:
using the wireless communication circuit, join the electronic device in a mesh network via a provisioning process, so that the electronic device is a node in the mesh network, wherein the mesh network includes a first device as a provisioner, the electronic device being in a coverage of a scanning of the first device,
receive, from a second external device outside the coverage of the scanning of the first device, second identification information associated with the second external device,
transmit the second identification information to the first device through the wireless communication circuit,
receive a role that allows performance the provisioning process on the second external device from the first device through the wireless communication circuit,
perform the provisioning process on the second external device through the wireless communication circuit, and
transmit, to the first device, information including device information associated with the second external device and a result of the provisioning process on the second external device through the wireless communication circuit.

19. The electronic device of claim 18, wherein the control circuit is further configured to provide information about at least one feature that the electronic device supports to the first device through the wireless communication circuit.

* * * * *